US010366537B2

(12) United States Patent
Kaino et al.

(10) Patent No.: US 10,366,537 B2
(45) Date of Patent: Jul. 30, 2019

(54) IMAGE PROCESSING APPARATUS, PROJECTION CONTROL METHOD, AND PROGRAM

(71) Applicant: SONY CORPORATION, Minato-ku (JP)

(72) Inventors: Akihiko Kaino, Kanagawa (JP); Kenichirou Ooi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 326 days.

(21) Appl. No.: 14/373,737

(22) PCT Filed: Mar. 25, 2013

(86) PCT No.: PCT/JP2013/001999
§ 371 (c)(1),
(2) Date: Jul. 22, 2014

(87) PCT Pub. No.: WO2013/168346
PCT Pub. Date: Nov. 14, 2013

(65) Prior Publication Data
US 2015/0029223 A1    Jan. 29, 2015

(30) Foreign Application Priority Data

May 8, 2012 (JP) ................................ 2012-106724

(51) Int. Cl.
*G06T 19/00* (2011.01)
*G09G 3/00* (2006.01)
(52) U.S. Cl.
CPC ........... *G06T 19/006* (2013.01); *G09G 3/002* (2013.01); *G09G 2360/04* (2013.01)
(58) Field of Classification Search
CPC ......... G06T 19/006; G06T 2207/20068; G06F 1/1639; G06F 1/1645; G06F 1/1673;
(Continued)

(56) References Cited

U.S. PATENT DOCUMENTS 6,278,418 B1    8/2001  Doi
8,228,315 B1 *  7/2012  Starner ................ G02B 27/017
                                                    345/175
(Continued)

FOREIGN PATENT DOCUMENTS

CN    102238987      11/2011
JP    2002-247602     8/2002
(Continued)

OTHER PUBLICATIONS

International Search Report dated Aug. 16, 2013, in International Application No. PCT/JP2013/001999.
(Continued)

*Primary Examiner* — Sae Won Yoon
(74) *Attorney, Agent, or Firm* — Xsensus LLP

(57) ABSTRACT

An information processing apparatus and method acquires an image, performs an image recognition process on the acquired image to recognize a physical object in that image, and then generates a virtual image based on the results of the image recognition process. The virtual image includes a virtual object positioned relative to the physical object that was recognized in the acquired image. A display then displays the virtual image, and a projector projects at least part of the virtual image. The apparatus and method also include modes in which the display displays the virtual image, but the projector does not project the virtual image, where the projector projects the virtual image but the display does not display the virtual image, and where the display displays the virtual image and the projector projects the virtual image.

14 Claims, 20 Drawing Sheets

(58) Field of Classification Search
CPC ........ G06F 3/011; G06F 3/012; G06F 3/0425;
H04N 5/7491; H04N 9/3173; H04N
9/3176; G02B 27/017; H04M 2203/359;
G05B 2219/32014; G05B 2219/39449;
G06K 9/00624; G06K 9/00671
USPC .......................................... 345/633; 382/103
See application file for complete search history.

(56) References Cited

U.S. PATENT DOCUMENTS

| | | | | |
|---|---|---|---|---|
| 8,549,418 | B2* | 10/2013 | Lamarca | G06F 3/0425 353/28 |
| 8,558,893 | B1* | 10/2013 | Persson | G08B 13/19684 348/151 |
| 2005/0078092 | A1* | 4/2005 | Clapper | G06F 1/1601 345/173 |
| 2009/0046140 | A1 | 2/2009 | Lashmet et al. | |
| 2009/0128552 | A1* | 5/2009 | Fujiki | G06T 15/06 345/419 |
| 2009/0244097 | A1 | 10/2009 | Estevez | |
| 2010/0017722 | A1* | 1/2010 | Cohen | A63F 13/10 715/740 |
| 2010/0022274 | A1* | 1/2010 | Roberts | H04M 1/0272 455/566 |
| 2010/0321389 | A1* | 12/2010 | Gay | G11B 27/036 345/427 |
| 2011/0007227 | A1 | 1/2011 | Yonishi | |
| 2011/0058109 | A1* | 3/2011 | Nishigaki | G06F 3/0425 348/744 |
| 2011/0096093 | A1* | 4/2011 | Oi | G06T 7/0044 345/633 |
| 2011/0181791 | A1* | 7/2011 | Huang | H04N 9/3158 348/744 |
| 2011/0248983 | A1* | 10/2011 | Kim | G03B 21/14 345/212 |
| 2011/0254860 | A1* | 10/2011 | Zontrop | A63F 13/04 345/633 |
| 2012/0013857 | A1* | 1/2012 | Yoshikawa | G03B 21/00 353/85 |
| 2012/0017147 | A1* | 1/2012 | Mark | G06F 1/1639 715/702 |
| 2012/0019526 | A1* | 1/2012 | Jung | G06T 11/00 345/419 |
| 2012/0105703 | A1 | 5/2012 | Lee et al. | |
| 2012/0113223 | A1* | 5/2012 | Hilliges | G06F 3/00 348/46 |
| 2012/0127203 | A1* | 5/2012 | Imai | G06F 3/011 345/633 |
| 2012/0194547 | A1* | 8/2012 | Johnson | G06T 11/00 345/632 |
| 2012/0249501 | A1 | 10/2012 | Yonishi | |
| 2012/0249741 | A1* | 10/2012 | Maciocci | G06F 3/011 348/46 |
| 2013/0050258 | A1* | 2/2013 | Liu | G02B 27/017 345/633 |
| 2013/0113812 | A1* | 5/2013 | Iwama | G06K 7/01 345/520 |
| 2013/0293584 | A1* | 11/2013 | Anderson | G06T 11/00 345/633 |
| 2013/0300637 | A1* | 11/2013 | Smits | G03B 35/18 345/8 |
| 2013/0335379 | A1* | 12/2013 | Sharma | G06F 1/1639 345/175 |
| 2015/0153572 | A1* | 6/2015 | Miao | G02B 27/0172 345/8 |

FOREIGN PATENT DOCUMENTS

| | | |
|---|---|---|
| JP | 2004-145448 | 5/2004 |
| JP | 2006-513509 | 4/2006 |
| JP | 2011-193243 | 9/2011 |
| JP | 2011-227644 | 11/2011 |
| WO | WO 2010/063409 | 6/2010 |
| WO | WO 2011/107423 A1 | 9/2011 |

OTHER PUBLICATIONS

Office Action dated Feb. 16, 2016 in Japanese Patent Application No. 2012-106724 (with English Translation).

Nagamatsu et al., "AR Guide System Using Mobile Projector in Indoor Environment," Paper Journal of Virtual Realty Society of Japan, Sep. 30, 2009, vol. 14, No. 3, pp. 283-294.

Chinese Office Action dated Dec. 19, 2016, issued in Chinese Patent Application No. 201310155552.5 (with English translation).

* cited by examiner

[Fig. 1]
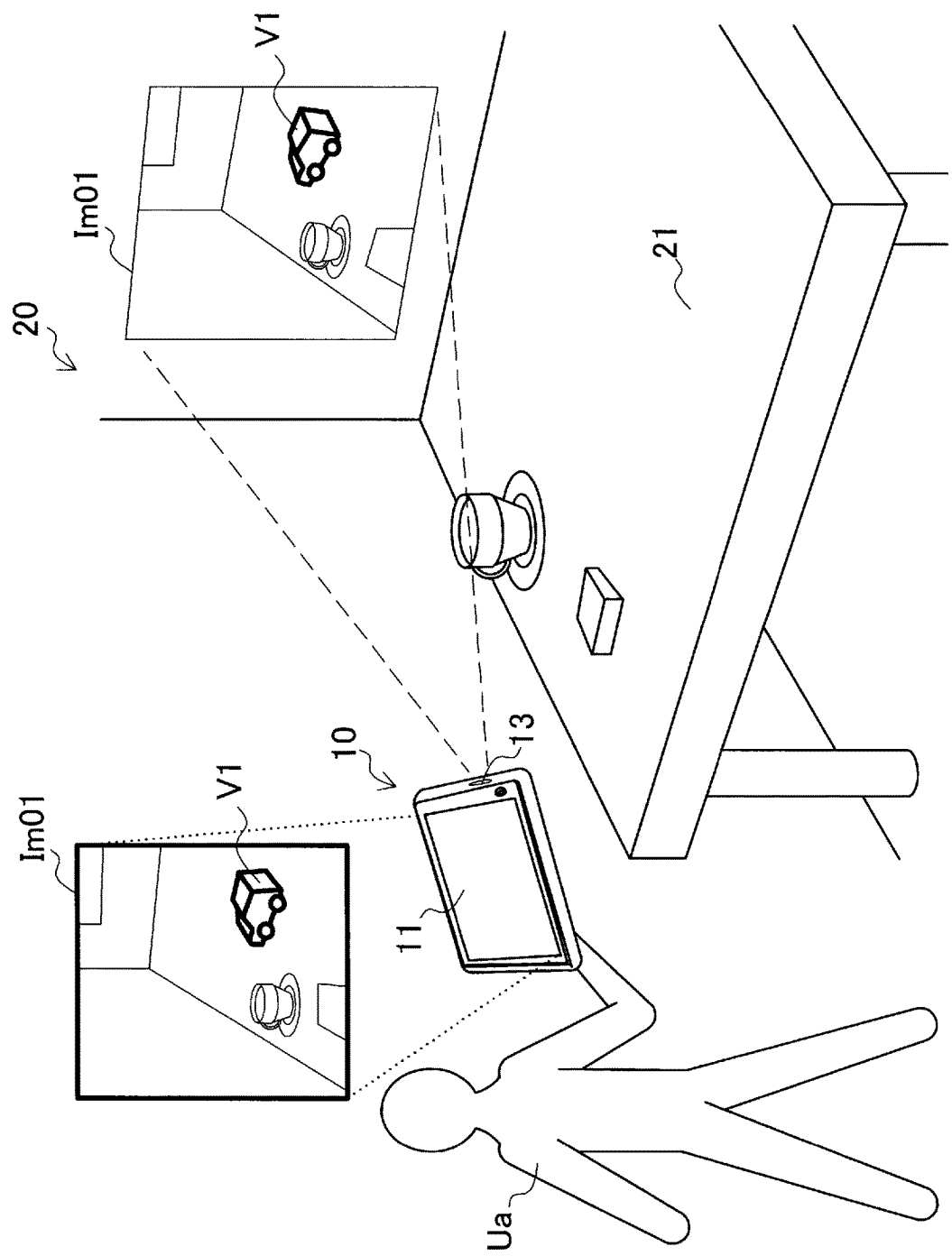

[Fig. 2]
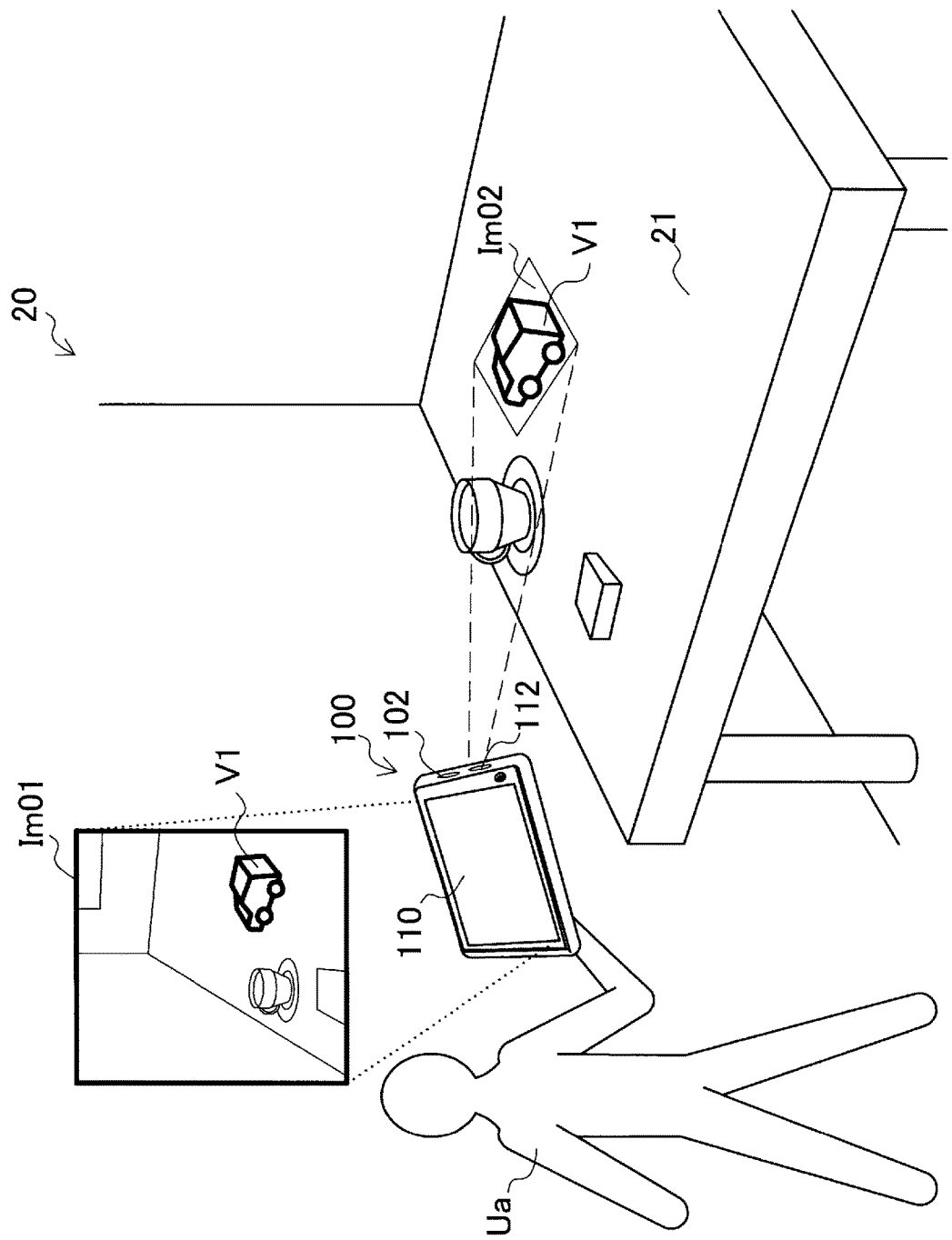

[Fig. 3]
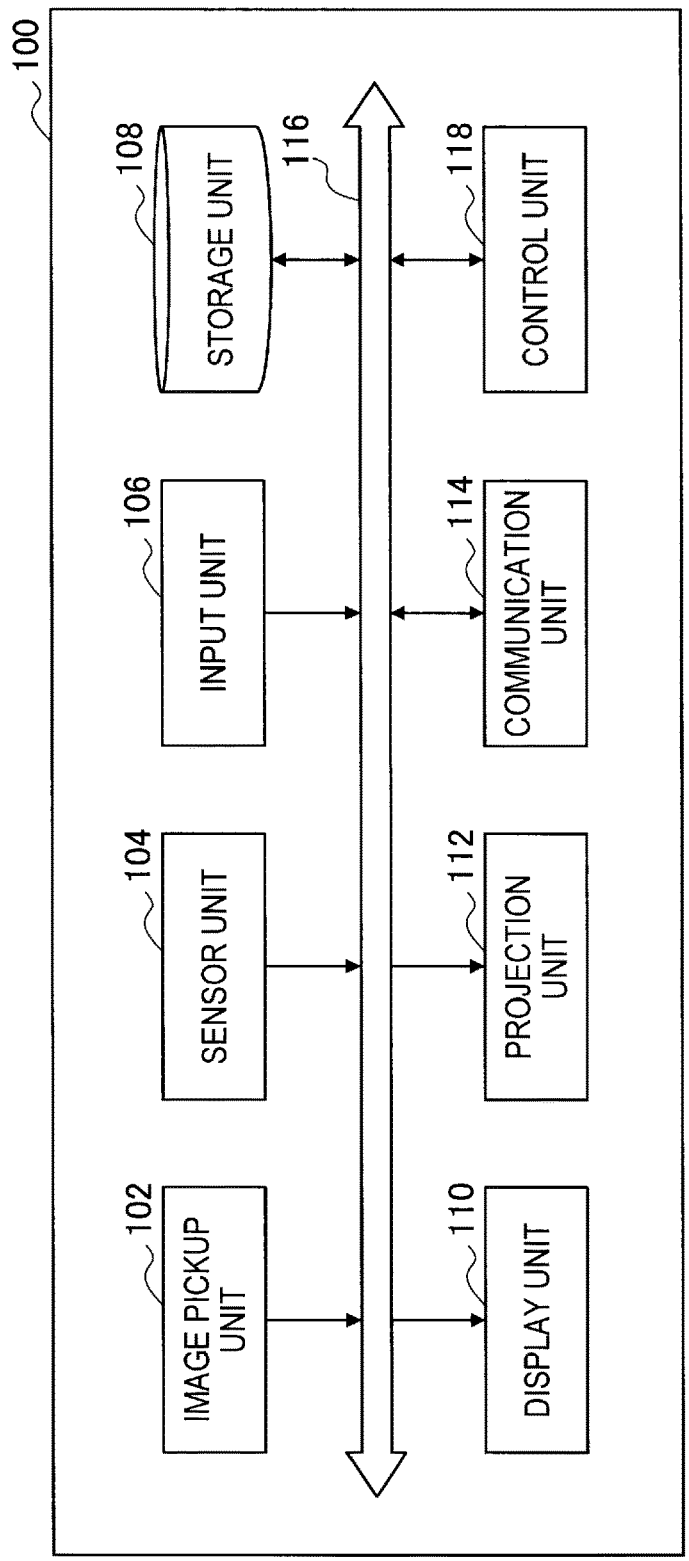

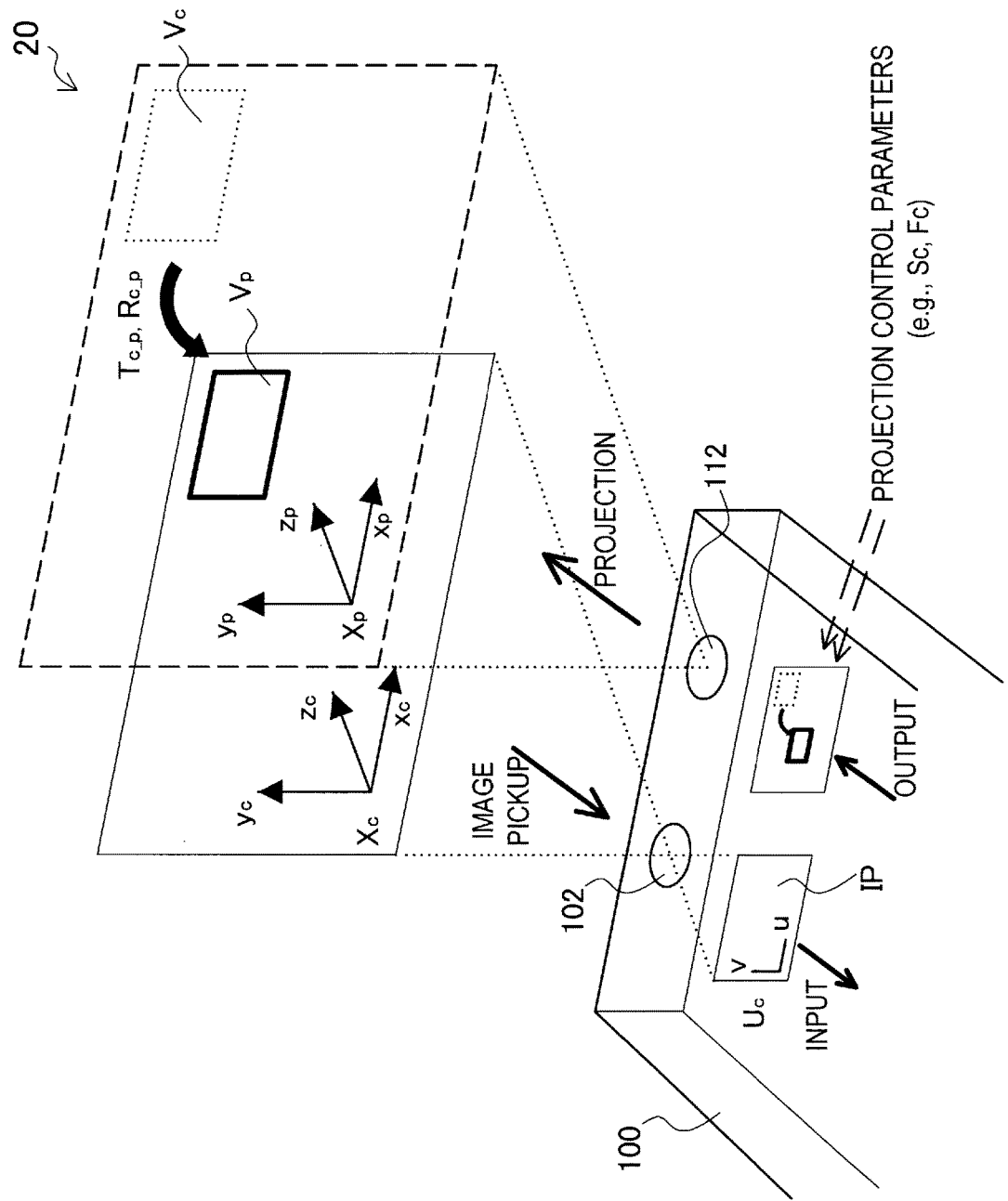
[Fig. 4]

[Fig. 5]
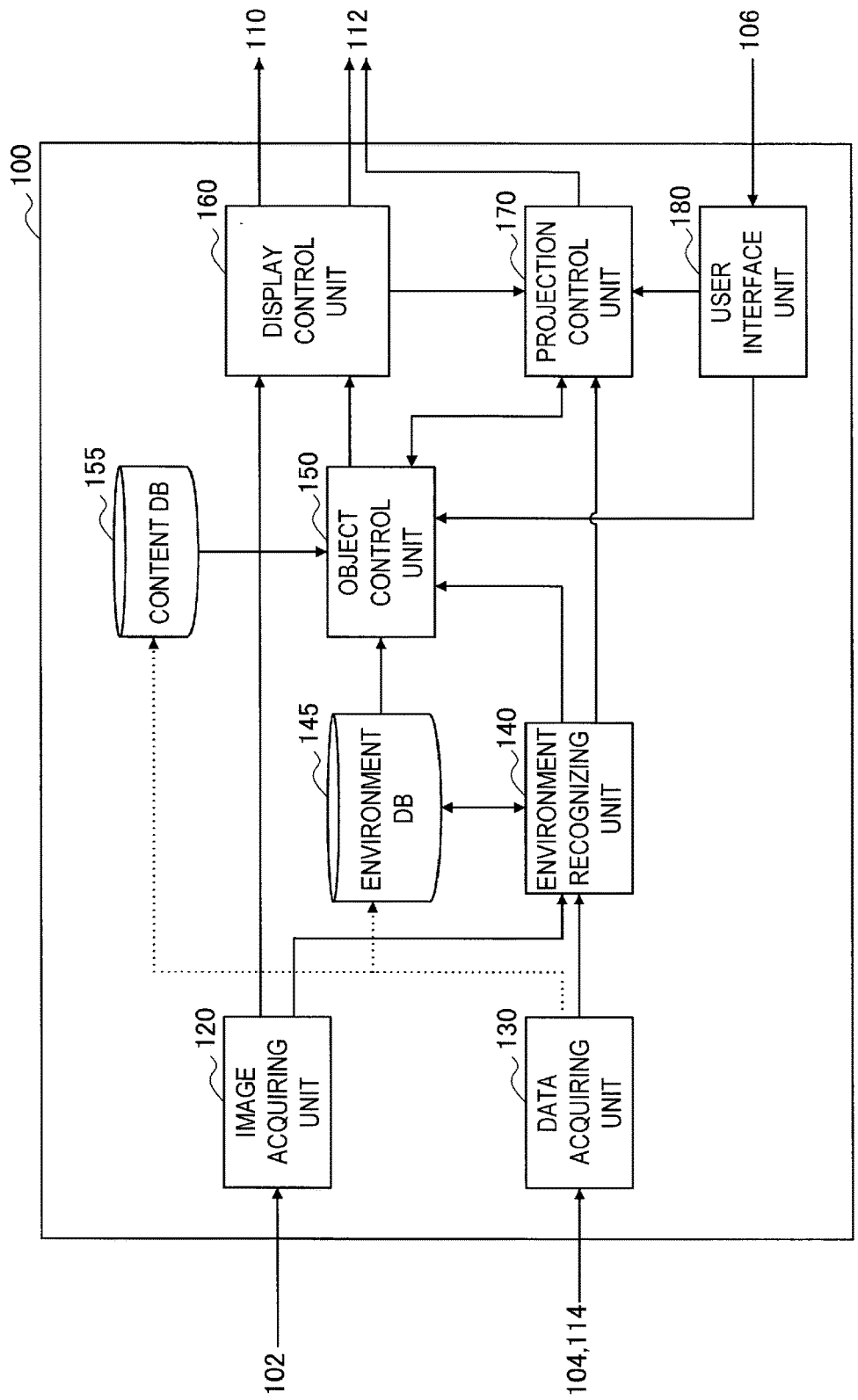

[Fig. 6]

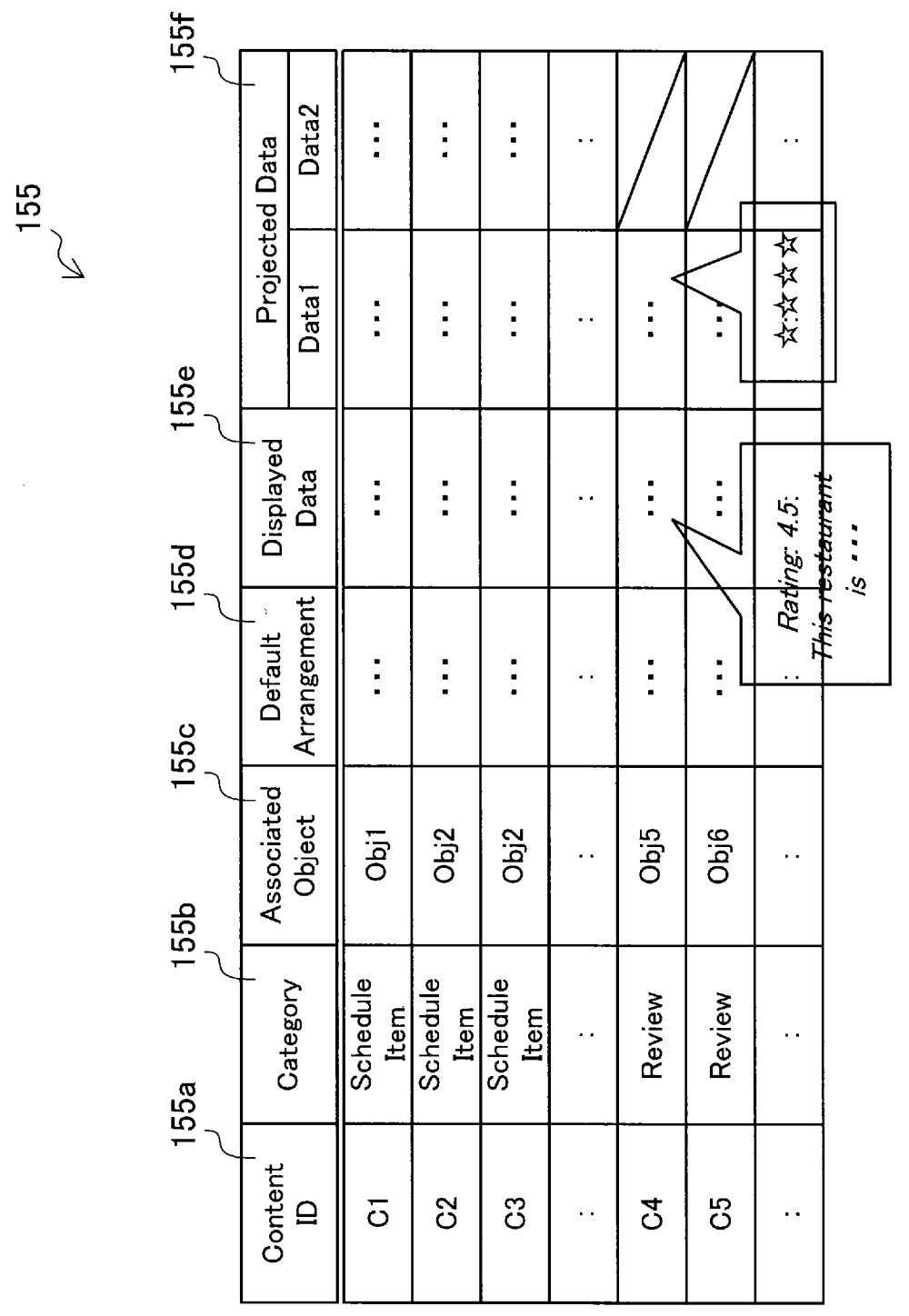

| Content ID | Category | Associated Object | Default Arrangement | Displayed Data | Projected Data | |
|---|---|---|---|---|---|---|
| | | | | | Data1 | Data2 |
| C1 | Schedule Item | Obj1 | ... | ... | ... | ... |
| C2 | Schedule Item | Obj2 | ... | ... | ... | ... |
| C3 | Schedule Item | Obj2 | ... | ... | ... | ... |
| .. | .. | .. | .. | .. | .. | .. |
| C4 | Review | Obj5 | ... | ... | ... | |
| C5 | Review | Obj6 | *Rating: 4.5: This restaurant is ....* | | ☆☆☆☆☆ | |
| .. | .. | .. | .. | .. | .. | .. |

155a 155b 155c 155d 155e 155f

155

[Fig. 7A]
M1: DISPLAY-ONLY MODE
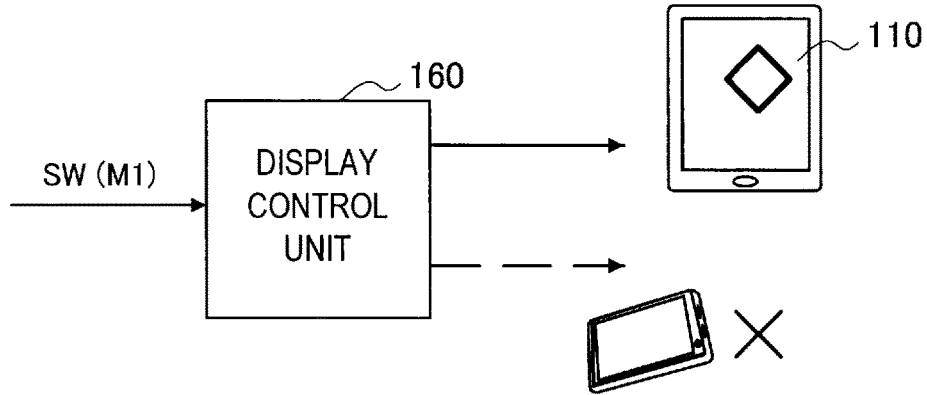
[Fig. 7B]
M2: DUAL MODE
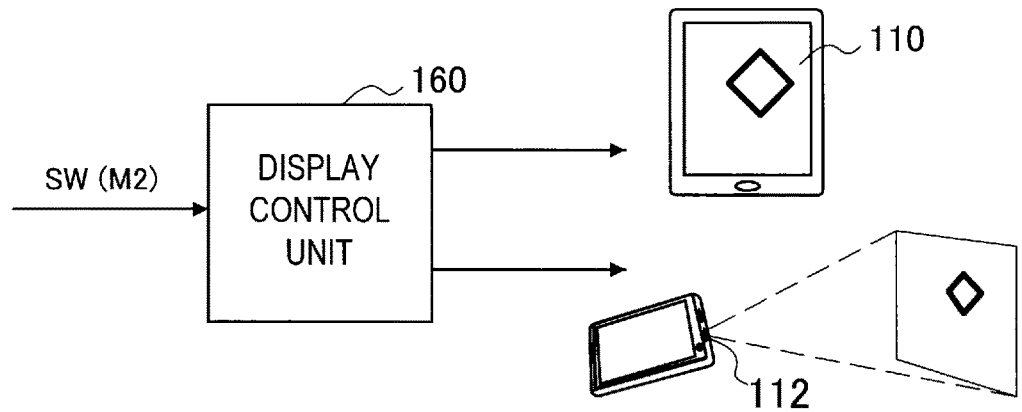
[Fig. 7C]
M3: PROJECTOR-ONLY MODE
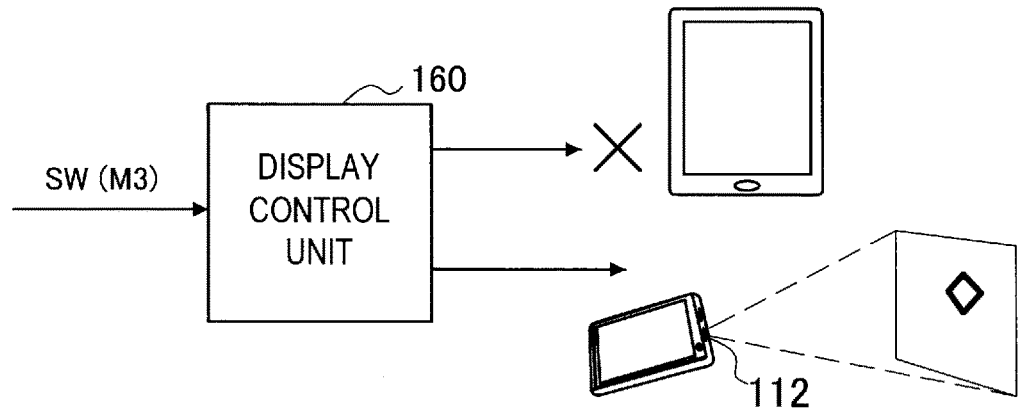

[Fig. 8]
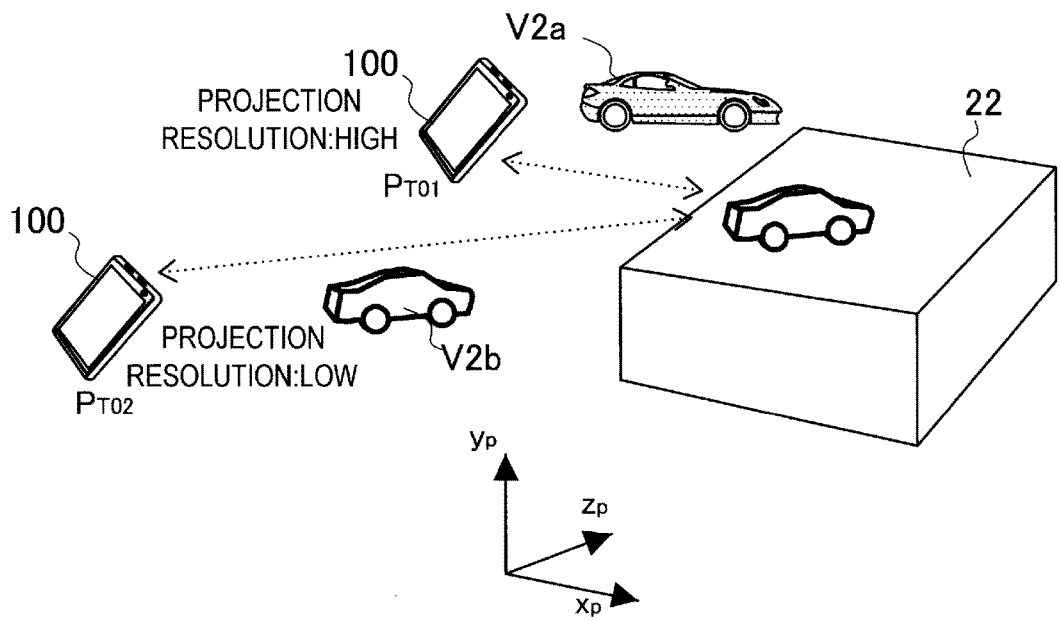
[Fig. 9A]
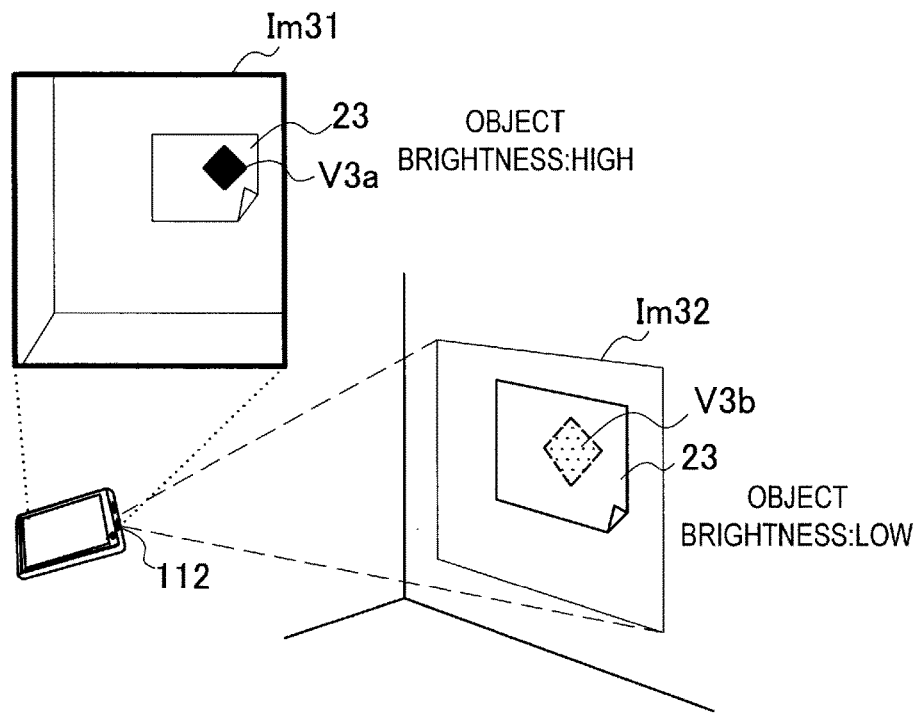

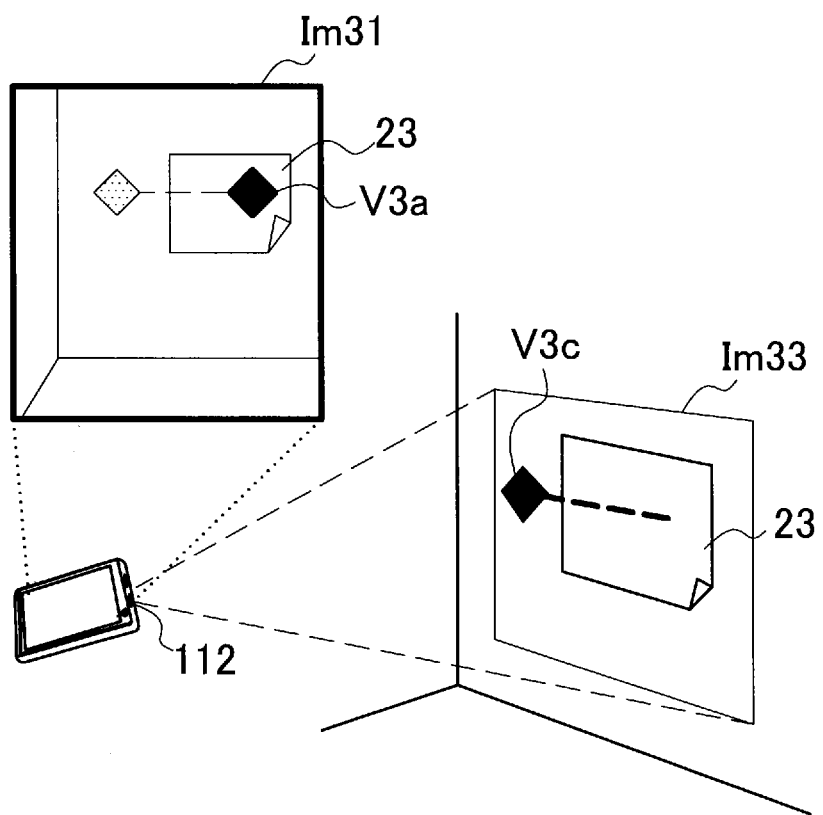
[Fig. 9B]

[Fig. 10A]
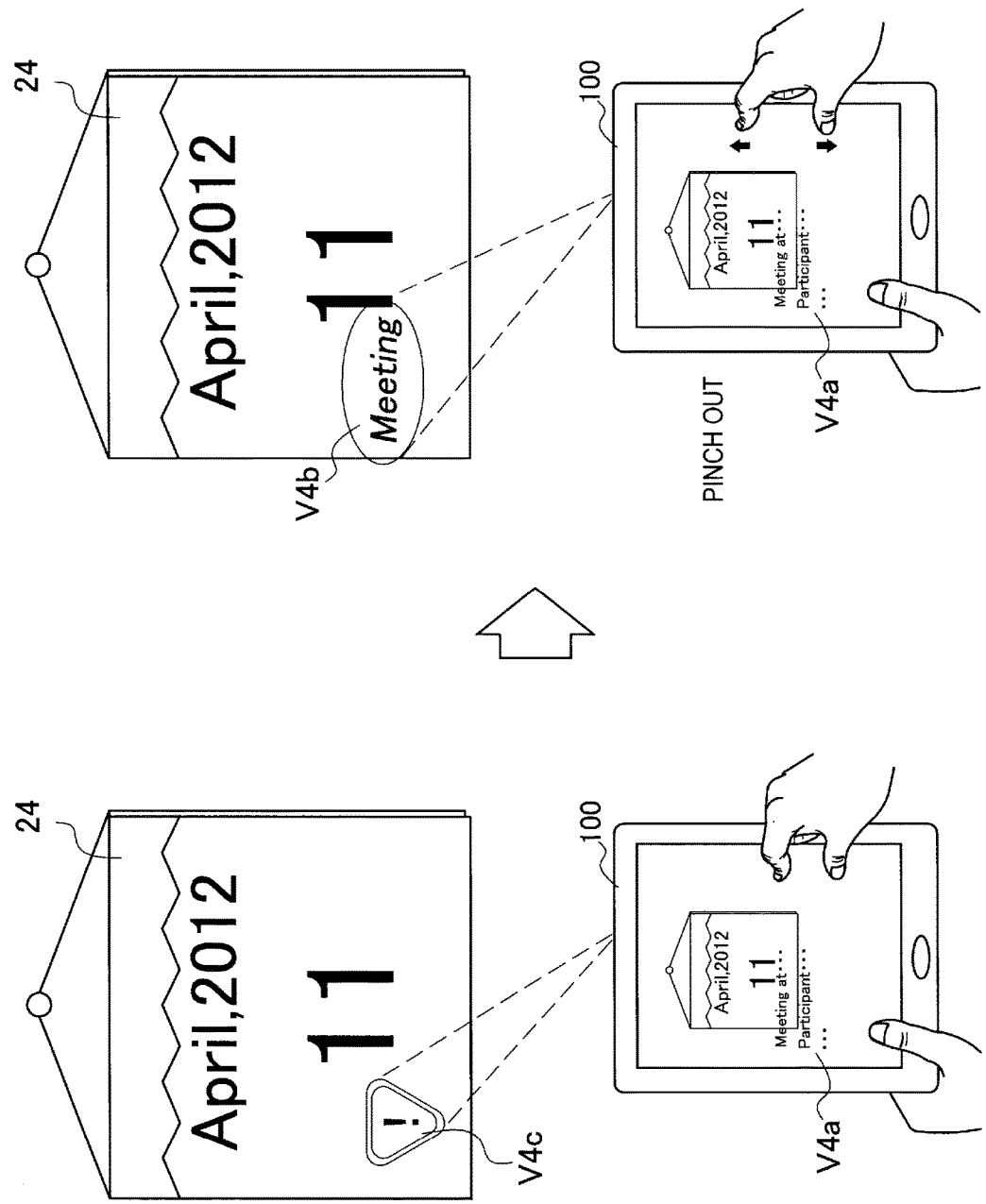

[Fig. 10B]
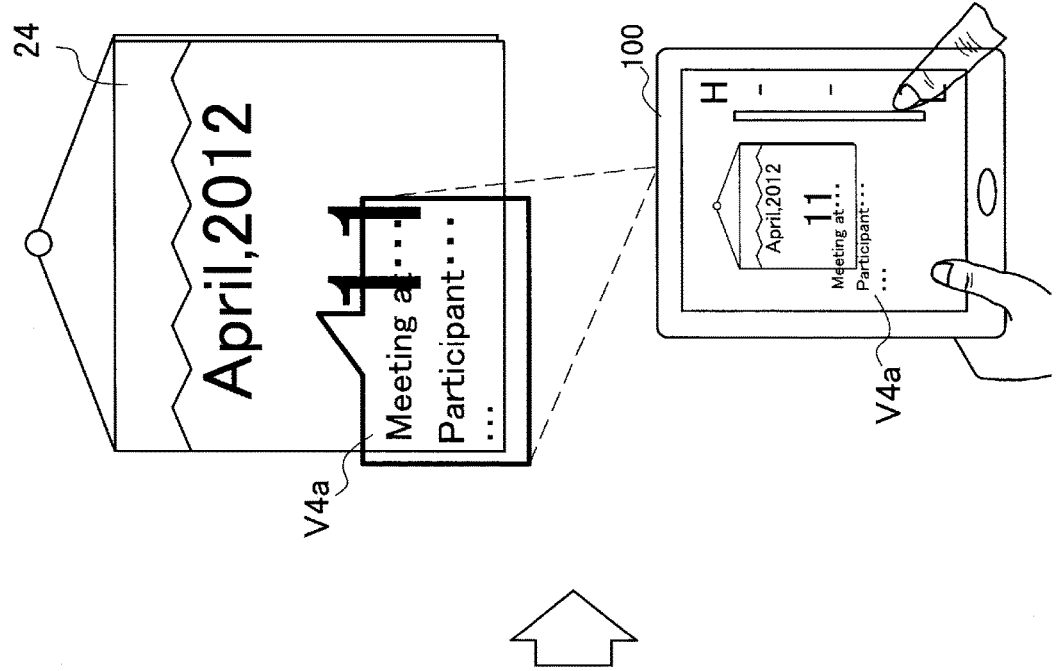
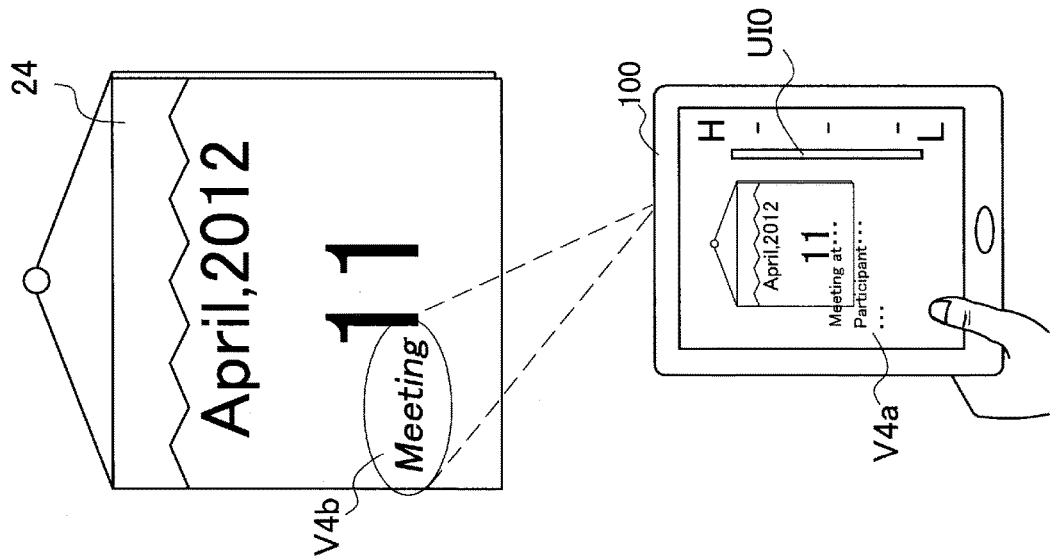

[Fig. 11A]
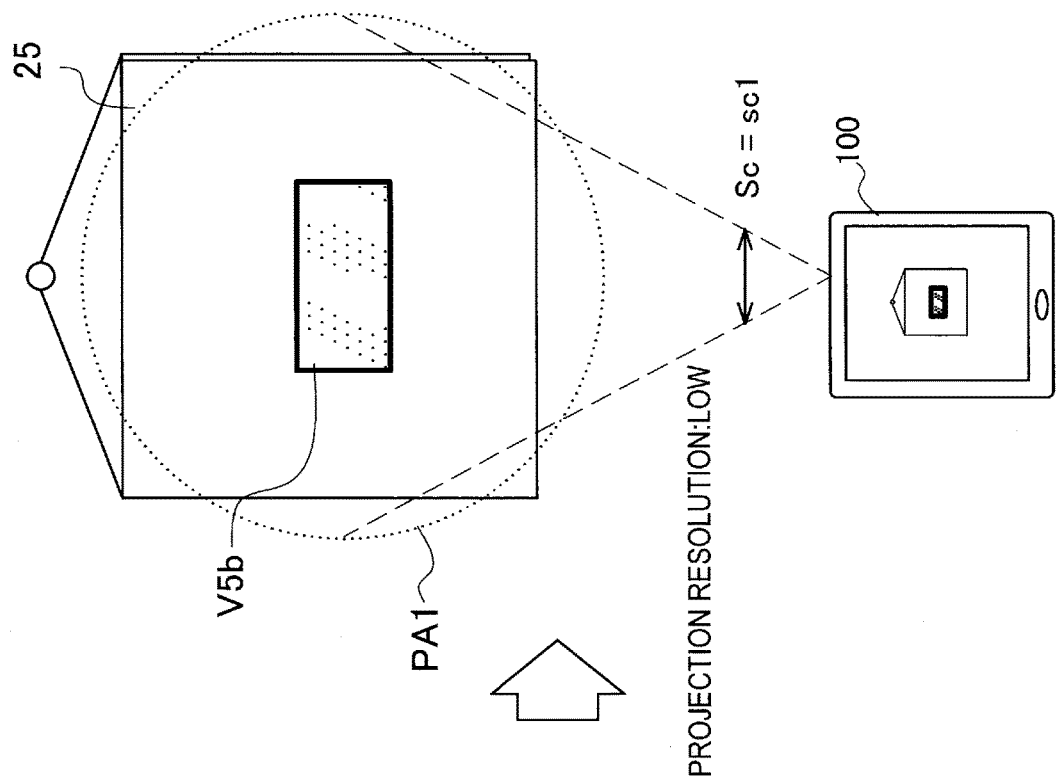
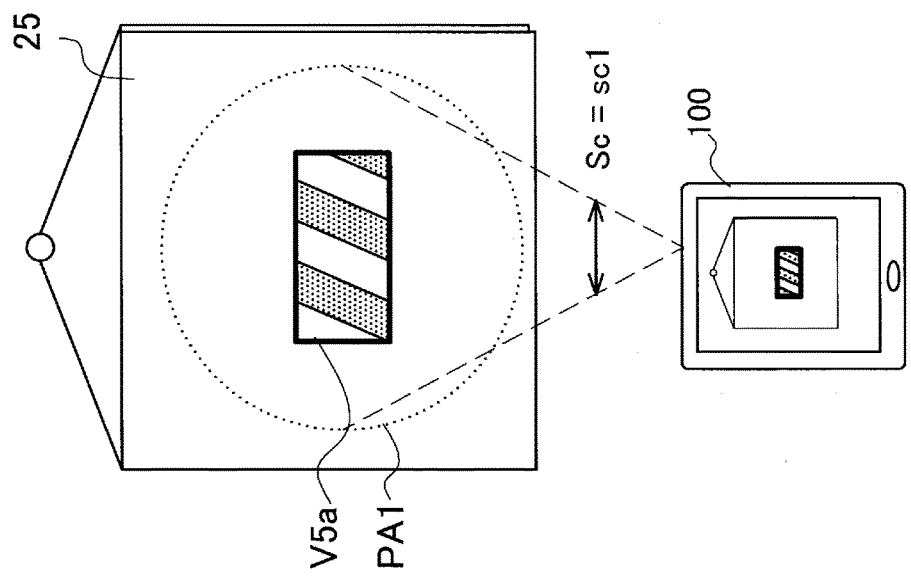

[Fig. 11B]
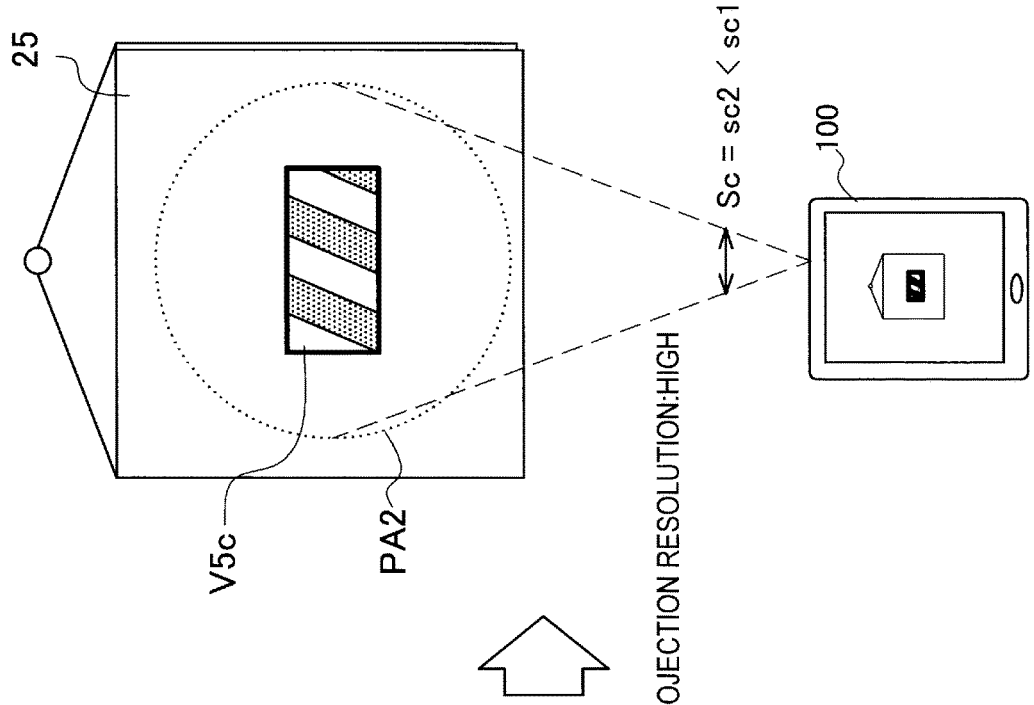
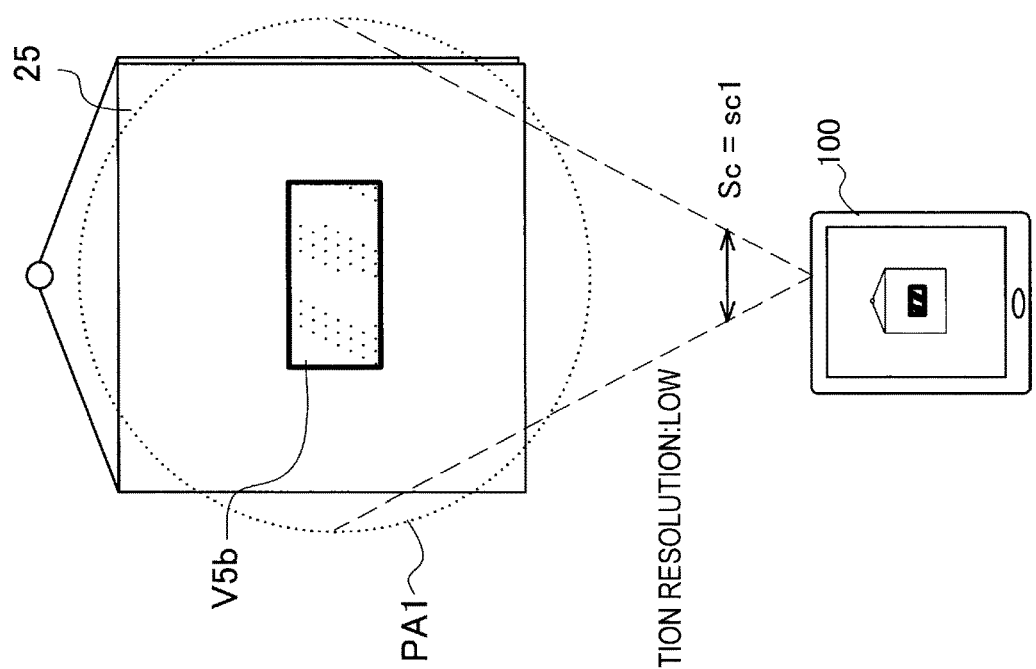

[Fig. 12A]
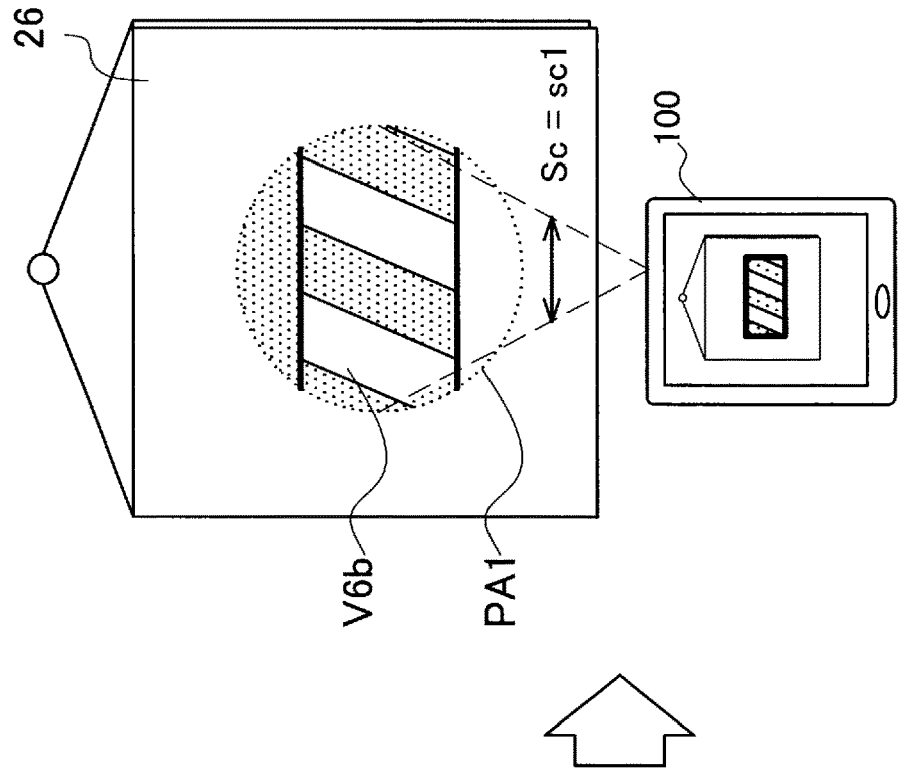
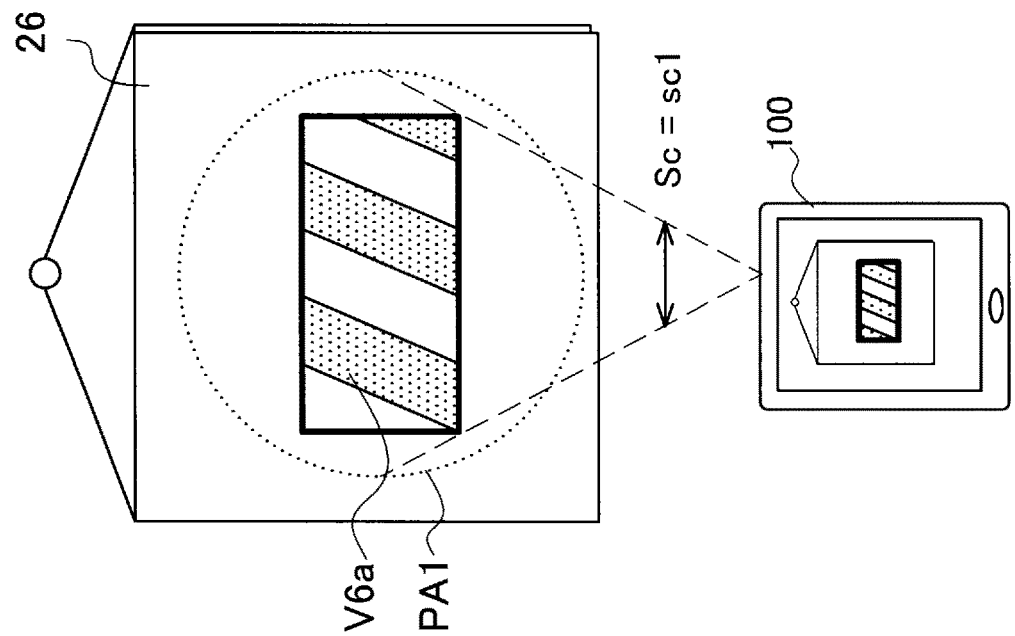

[Fig. 12B]
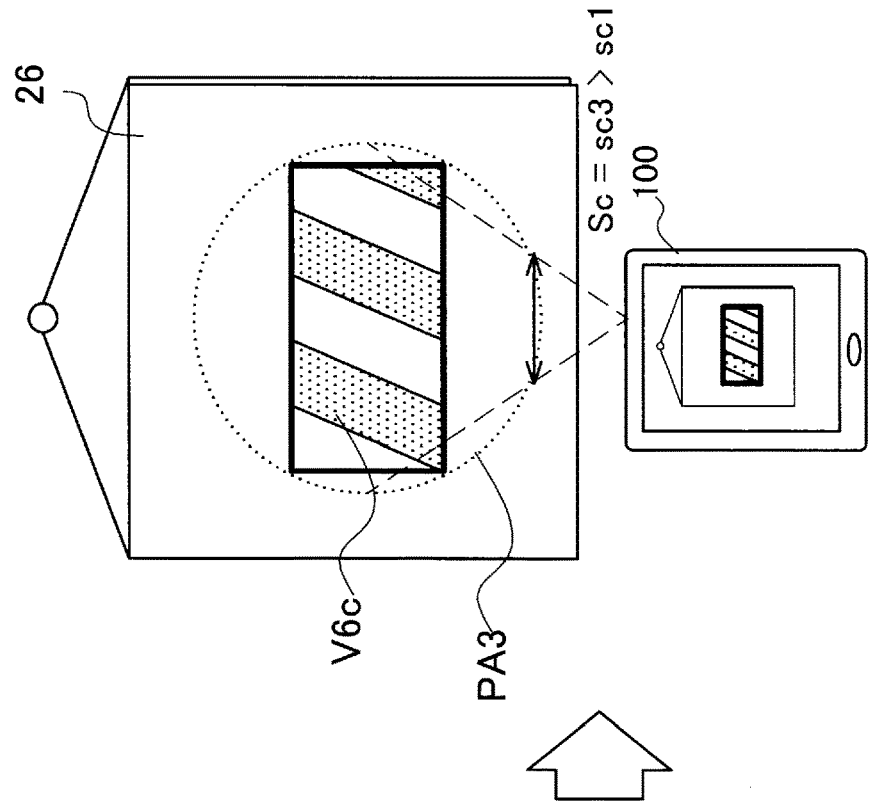
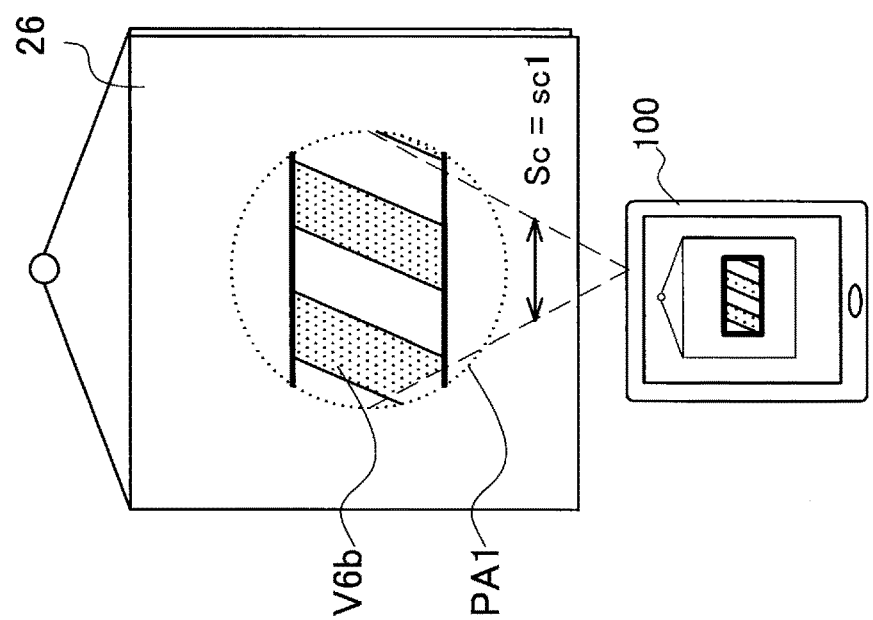

[Fig. 13]
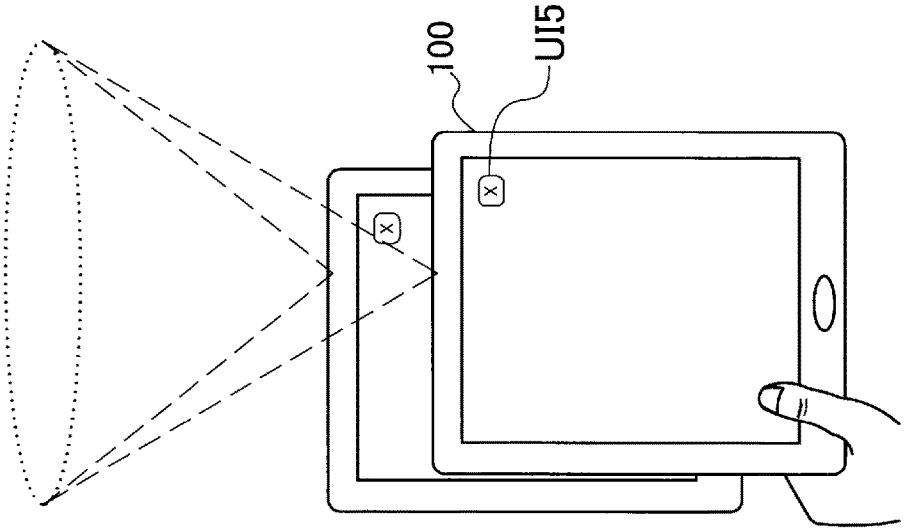
Ph2: MAINTENANCE PHASE
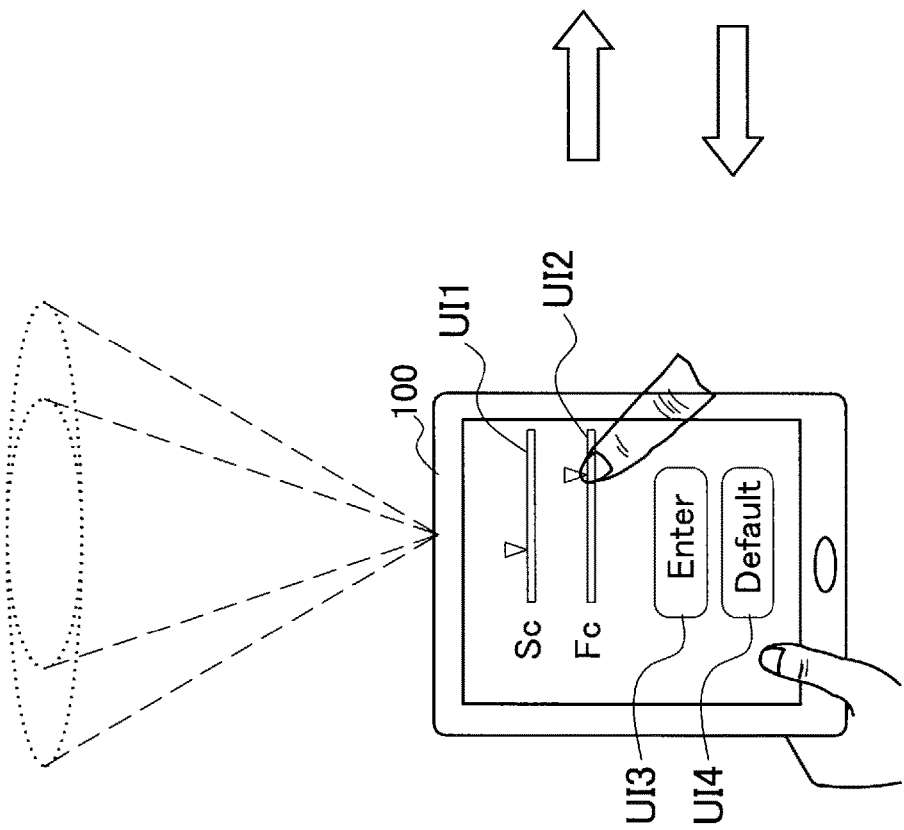
Ph1: ADJUSTMENT PHASE

[Fig. 14]
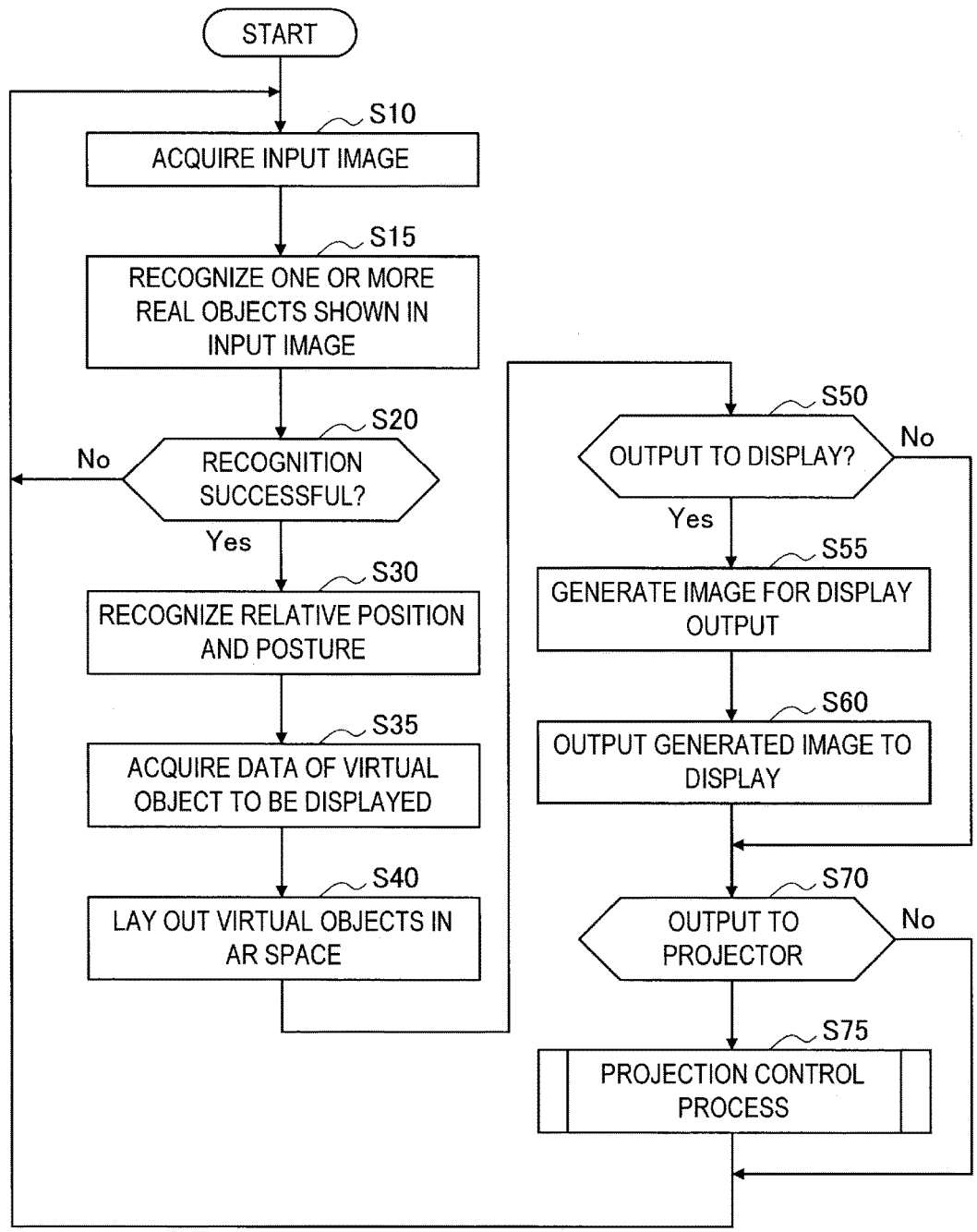

[Fig. 15]
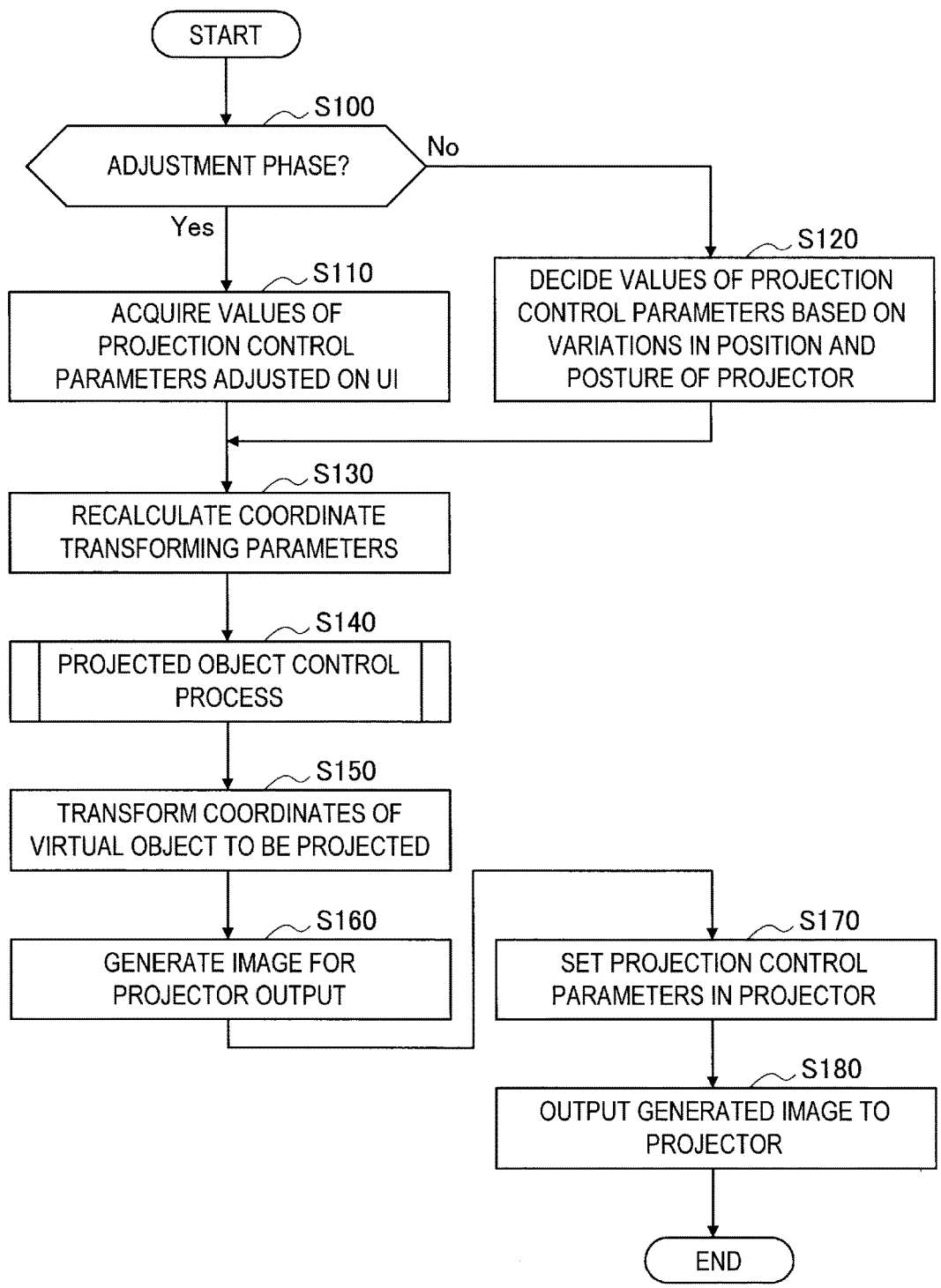

[Fig. 16]
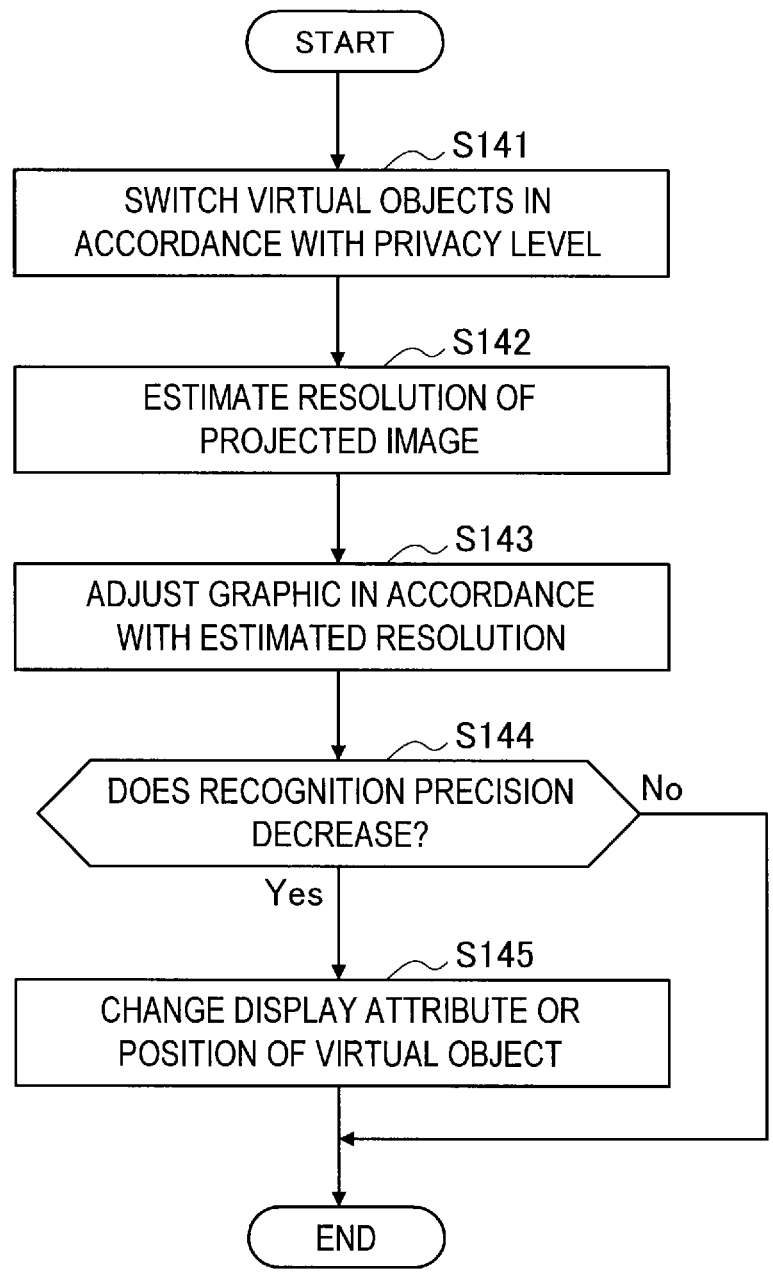

[Fig. 17]
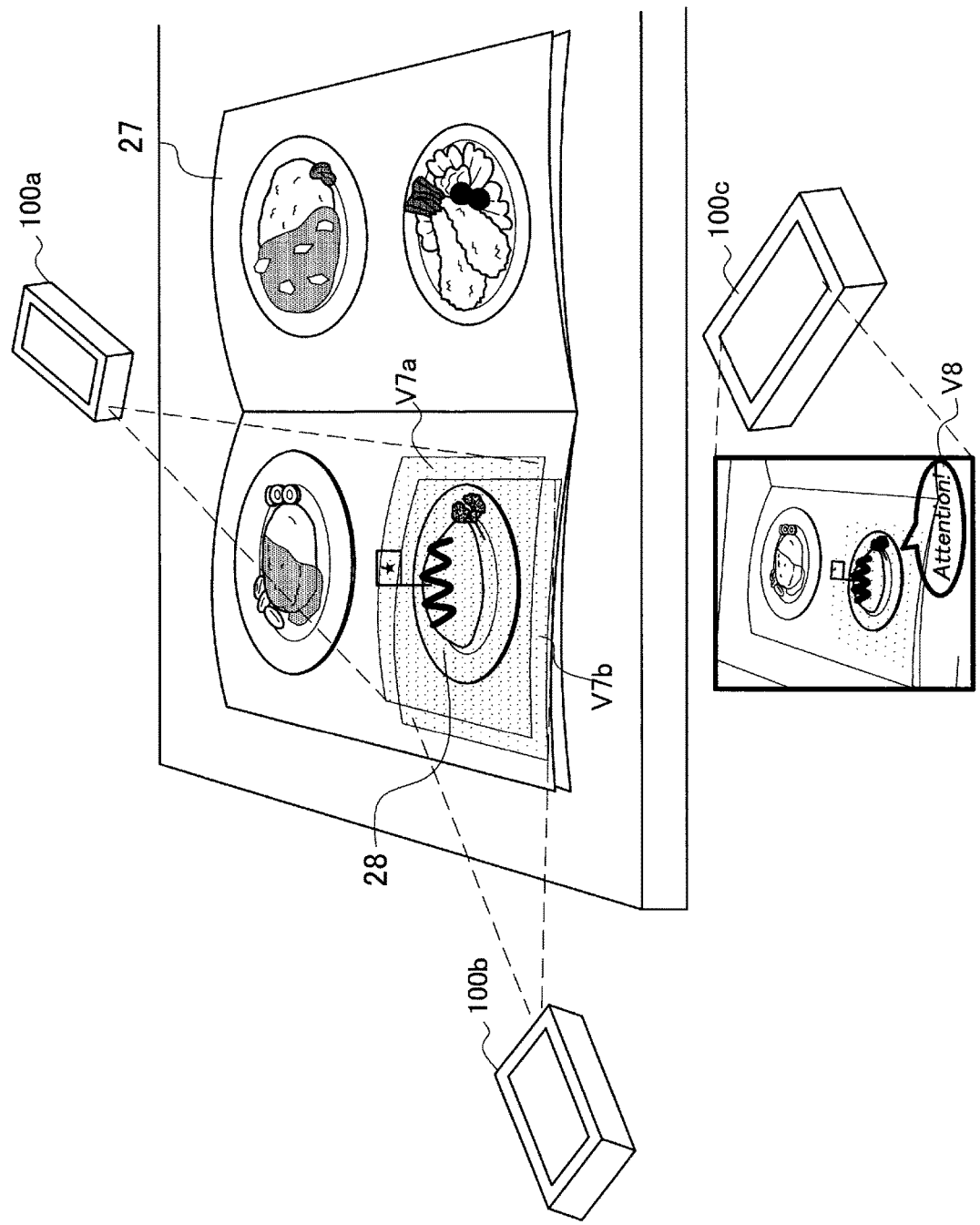

IMAGE PROCESSING APPARATUS, PROJECTION CONTROL METHOD, AND PROGRAM

CROSS-REFERENCE TO RELATED APPLICATIONS

The present disclosure contains subject matter related to that disclosed in Japanese Priority Patent Application JP 2012-106724 filed in the Japan Patent Office on May 8, 2012, the entire content of which is hereby incorporated by reference.

TECHNICAL FIELD

The present disclosure relates to an image processing apparatus, a projection control method, and a program.

BACKGROUND ART

In recent years, attention has been focused on a technology called augmented reality (AR) that presents additional information to the user by overlaying such content onto a real space. The information presented to the user by AR technology may be visualized using virtual objects in a variety of forms, such as text, icons, and animations. The virtual objects are laid out in an AR space in accordance with the positions of associated real objects. Virtual objects are normally displayed on a screen such as the display of a mobile terminal, a head-mounted display, or an eyeglasses-type display. However, such displays are usually designed with a premise of being viewed by a single user. This means that is difficult for a third party to know what AR content is being provided to a user.

However, terminals with projection apparatuses (or so-called "projectors") capable of projecting images onto a real space are also being developed (see for example PTL 1 listed below). If AR content is projected using a projection apparatus, it is possible for a third party to know what AR content is being provided.

CITATION LIST

Patent Literature

PTL 1: JP 2011-193243A

SUMMARY

Technical Problem

However, if AR content is merely projected onto some type of projection surface in a real space, the projected virtual objects will simply appear on a projection surface that has no direct relationship to the real objects to which such virtual objects are associated. In such case, a third party is not provided with a sense of "augmented reality", that is, an expanded version of the real world. Accordingly, instead of simply projecting the same AR content as AR content for display output, it would be desirable to provide a framework capable of controlling the projection of AR content in accordance with the characteristics of augmented reality.

Solution to Problem

An information processing apparatus including an image pickup unit configured to acquire an image, and a processor configured to perform an image recognition process on the image acquired by the image pickup unit to recognize a physical object in the image and to generate a virtual image including a virtual object positioned relative to the physical object recognized in the image. The information processing apparatus also includes a display unit configured to display the virtual image, and a projection unit configured to project at least a portion of the virtual image.

An information processing method includes acquiring an image in an image pickup unit; performing, in a processor, an image recognition process on the image acquired to recognize a physical object in the image; generating, in the processor, a virtual image including a virtual object positioned relative to the physical object recognized in the image; displaying the virtual image in a display unit; and projecting at least a portion of the virtual image by a projection unit.

A non-transitory computer-readable medium storing computer readable instructions thereon that when executed by a computer cause the computer to perform a method including acquiring an image; performing an image recognition process on the image acquired to recognize a physical object in the image; generating a virtual image including a virtual object positioned relative to the physical object recognized in the image; displaying the virtual image; and projecting at least a portion of the virtual image.

An information processing system includes a plurality of information processing devices, each including an image pickup unit configured to acquire an image; a processor configured to perform an image recognition process on the image acquired by the image pickup unit to recognize a physical object in the image, and generate a virtual image including a virtual object positioned relative to the physical object recognized in the image, a display unit configured to display the virtual image under control of the processor, and a projection unit configured to project at least a portion of the virtual image under control of the processor, wherein one of the plurality of information processing devices determines an interest level in the physical object based on a light intensity of virtual images projected by other information processing devices

Advantageous Effects of Invention

According to the above embodiments of the present disclosure, it is possible to control the projection of AR content in accordance with the characteristics of augmented reality.

BRIEF DESCRIPTION OF DRAWINGS

FIG. 1 is a diagram useful in explaining projection of AR content according to a known method.

FIG. 2 is a diagram useful in explaining an overview of an image processing apparatus according to an embodiment of the present disclosure.

FIG. 3 is a block diagram showing one example of the hardware configuration of the image processing apparatus according to the present embodiment.

FIG. 4 is a diagram useful in explaining an example of a physical layout of an image pickup unit and a projection unit.

FIG. 5 is a block diagram showing one example of a configuration of logical functions of the image processing apparatus according to the present embodiment.

FIG. 6 is a diagram useful in explaining one example of the data structure of a content DB.

FIG. 7A is a diagram useful in explaining a first example of a display mode.

FIG. 7B is a diagram useful in explaining a second example of the display mode.

FIG. 7C is a diagram useful in explaining a third example of the display mode.

FIG. 8 is a diagram useful in explaining control of a virtual object in accordance with projection resolution.

FIG. 9A is a diagram useful in explaining a first example of control of virtual objects to prevent a drop in recognition precision.

FIG. 9B is a diagram useful in explaining a second example of control of virtual objects to prevent a drop in recognition precision.

FIG. 10A is a diagram useful in explaining a first example of control of virtual objects in accordance with a privacy level indicated by the user.

FIG. 10B is a diagram useful in explaining a second example of control of virtual objects in accordance with a privacy level indicated by the user.

FIG. 11A is a diagram useful in explaining a first example of a situation where the projection state may become inappropriate.

FIG. 11B is a diagram useful in explaining control for maintaining the projection state in the situation in FIG. 11A.

FIG. 12A is a diagram useful in explaining a second example of a situation where the projection state may become inappropriate.

FIG. 12B is a diagram useful in explaining control for maintaining the projection state in the situation in FIG. 12A.

FIG. 13 is a diagram useful in explaining one example of a user interface that may be provided in order to utilize the projection control parameters.

FIG. 14 is a flowchart showing one example of the overall flow of processing according to the present embodiment.

FIG. 15 is a flowchart showing one example of the detailed flow of the projection control process shown in FIG. 14.

FIG. 16 is a flowchart showing one example of the detailed flow of the projected object control process shown in FIG. 15.

FIG. 17 is a diagram useful in explaining one example of an AR application that may be realized by applying the technology according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview
2. Configuration of Apparatus According to an Embodiment
 2-1. Hardware Configuration
 2-2. Transformation of Coordinates for Projector Output
 2-3. Functional Configuration
 2-4. Various Display Modes
 2-5. Control of Projected Virtual Objects
 2-6. Utilization of Projection Control Parameters
3. Flow of Processing
 3-1. Overall Flow
 3-2. Projection Control Process
 3-3. Projected Object Control Process
4. Example Application
5. Conclusion 1. Overview First, an overview of the technology according to an embodiment of the present disclosure will be described with reference to FIGS. 1 and 2.

FIG. 1 is a diagram useful in explaining projection of AR content according to an existing method. In FIG. 1, an image processing apparatus 10 held by a user Ua is shown. The image processing apparatus 10 includes a display unit 11 displaying an image, an image pickup unit (not shown) that is provided for example on a rear surface of the display unit 11 and picks up images of a real space 20, and a projection unit 13 that projects images. In the example in FIG. 1, a table 21 that is a real object is present in the real space 20. A control unit (not shown) of the image processing apparatus 10 receives the picked up images as input images and has an augmented reality (AR) application carried out. The display unit 11 displays images on which virtual objects have been overlaid by the AR application. In the example in FIG. 1, an image Im01 is displayed with a virtual object V1 being overlaid on the image Im01 just as if such virtual object V1 were actually present on the table 21. The projection unit 13 projects such image Im01 onto a projection surface in the real space (as examples, a wall surface, a floor surface, or the surface of a real object). In the example in FIG. 1, the image Im01 is projected onto a wall surface.

By looking at the projected image Im01, a third party, that is, a person aside from the user Ua, can know what AR content is being provided to the user Ua. However, the virtual object V1 in the image Im01 is not present on the table 21 in the real space 20. Accordingly, the third party is not provided with a sense of "augmented reality", that is, an expanded version of the real world.

FIG. 2 is a diagram useful in explaining an overview of the image processing apparatus 100 according to an embodiment of the present disclosure. FIG. 2 shows an image processing apparatus 100 held by the user Ua in the same real space 20 as in FIG. 1. The image processing apparatus 100 includes an image pickup unit 102, a display unit 110, and a projection unit 112. A control unit (not shown) of the image processing apparatus 100 receives images picked up by the image pickup unit 102 as input images and has an AR application carried out. The display unit 110 displays an image (for example, an image Im01) in which virtual objects have been overlaid by the AR application. Instead of the image Im01 displayed by the display unit 110, the projection unit 112 projects an image Im02 that has been adapted for projection. In the example in FIG. 3, the image Im02 representing a virtual object V1 is projected onto a three-dimensional position on the table 21 that corresponds to the display position of the virtual object V1 in the AR space.

By looking at the image Im02, the third party can experience a sense of the virtual object V1 actually being present on the table 21 in the same way as the user Ua. By doing so, the sharing of augmented reality by the user Ua and the third party is realized. Also, if a virtual object is projected on the subject of an AR application in a public place, it will be possible for a third party to know the intention of an action taken by a user holding up a camera. By doing so, it is possible to prevent a suspicious expression from being given to a third party or to stimulate the interest of the third party and encourage the third party to join in the AR application.

The configuration of an apparatus for realizing such projection will be described in detail in the next section. Note that the projection of virtual objects for augmented reality involves a number of specific issues, such as the projection resolution, the precision of environment recognition, privacy, and the stability of the projection. Measures for dealing with such issues are also provided by the present disclosure.

In FIG. 2, a mobile terminal is shown as one example of the image processing apparatus 100. However, the image processing apparatus 100 is not limited to such example. As other examples, the image processing apparatus 100 may be a PC (Personal Computer), a PDA (Personal Digital Assistant), a smartphone, a game terminal, a PND (Portable Navigation Device), a content player, or a digital home appliance. Also, instead of running on the terminal operated by the user, the AR application may run on another apparatus (such as an application server) that is capable of communicating with the terminal.

2. Configuration of Apparatus According to an Embodiment

2-1. Hardware Configuration

FIG. 3 is a block diagram showing one example of the hardware configuration of the image processing apparatus 100 according to an embodiment. As shown in FIG. 3, the image processing apparatus 100 includes the image pickup unit 102, a sensor unit 104, an input unit 106, a storage unit 108, a display unit 110, a projection unit 112, a communication unit 114, a bus 116, and a control unit 118.

(1) Image Pickup Unit

The image pickup unit 102 is a camera module that picks up an image. The image pickup unit 102 picks up images of a real space using an image pickup element such as a CCD (Charge Coupled Device) or a CMOS (Complementary Metal Oxide Semiconductor) to generate a picked-up image. The picked-up images generated by the image pickup unit 102 are used as input images for image processing performed by the control unit 118. Note that the image pickup unit 102 does not need to be part of the image processing apparatus 100. As one example, an image pickup apparatus connected to the image processing apparatus 100 wirelessly or using wires may be treated as the image pickup unit 102.

(2) Sensor Unit

The sensor unit 104 may include a variety of sensors such as a positioning sensor (for example, a GPS (Global Positioning System) module), a geomagnetic sensor, an acceleration sensor, and a gyro sensor. The positioning sensor measures a present location of a terminal. The geomagnetic sensor measures the present posture (orientation) of the terminal. Measurement results obtained by the sensor unit 104 may be used in a variety of applications, such as acquiring data that is specific to a geographic position, supporting environment recognition, and detecting a user input. Note that the sensor unit 104 may be omitted from the configuration of the image processing apparatus 100.

(3) Input Unit

The input unit 106 is an input device used by the user to operate the image processing apparatus 100 or to input information into the image processing apparatus 100. As one example, the input unit 106 may include a touch sensor that detects touches made by the user on the screen of the display unit 110. In place of (or in addition to) this, the input unit 106 may include a pointing device such as a mouse or a touch pad. In addition, the input unit 106 may include another type of input device such as a keyboard, a keypad, a button or buttons, or a switch or switches.

(4) Storage Unit

The storage unit 108 is constructed of a storage medium such as a semiconductor memory or a hard disk drive and stores programs and data for processing by the image processing apparatus 100. The data stored by the storage unit 108 may include picked-up image data, sensor data, and data in a variety of databases (DB), described later. Note that instead of being stored in the storage unit 108, some of the programs and data described in the present specification may be acquired from an external data source (as examples, a data server, network storage, or an external memory).

(5) Display Unit

The display unit 110 is a display module including a display such as an LCD (Liquid Crystal Display), an OLED (Organic Light-Emitting Diode), or a CRT (Cathode Ray Tube). As one example, the display unit 110 is used to display an image of AR application generated by the image processing apparatus 100. Note that the display unit 110 also does not need to be part of the image processing apparatus 100. As one example, a display apparatus connected to the image processing apparatus 100 wirelessly or using wires may be treated as the display unit 110.

(6) Projection Unit

The projection unit 112 is a projector module, such as a liquid crystal projector, a DLP (Digital Light Processing) projector (registered trademark), or an LCOS (Liquid Crystal On Silicon) projector. The projection unit 112 is used for example to project virtual objects of an AR application generated by the image processing apparatus 100 onto a projection surface in a real space. Note that the projection unit 112 does not need to be part of the image processing apparatus 100. As one example, a projection apparatus connected to the image processing apparatus 100 wirelessly or using wires may be treated as the projection unit 112.

(7) Communication Unit

The communication unit 114 is a communication interface that serves as a mediator for communication by the image processing apparatus 100 with other apparatuses. The communication unit 114 supports an arbitrary wireless communication protocol or wired communication protocol and establishes a communication connection with other apparatuses.

(8) Bus

The bus 116 connects the image pickup unit 102, the sensor unit 104, the input unit 106, the storage unit 108, the display unit 110, the projection unit 112, the communication unit 114, and the control unit 118 to one another.

(9) Control Unit

The control unit 118 corresponds to a processor such as a CPU (Central Processing Unit) or a DSP (Digital Signal Processor). By executing a program stored in the storage unit 108 or another storage medium, the control unit 118 causes the image processing apparatus 100 to function in a variety of ways as described later.

2-2. Transformation of Coordinates for Projector Output

In the present embodiment, it is assumed that the physical arrangement of the image pickup unit 102 and the projection unit 112 is calibrated in advance and that the relative positions and postures of the image pickup unit 102 and the projection unit 112 are known by the image processing apparatus 100. FIG. 4 shows an example of the physical arrangement of the image pickup unit 102 and the projection unit 112.

As shown in FIG. 4, the lens of the image pickup unit 102 and the lens of the projection unit 112 are disposed next to one another on a surface of a case of the terminal. The optical axis of the image pickup unit 102 and the optical axis of the projection unit 112 are oriented in substantially the same direction. An image pickup plane IP where a plurality of image pickup elements are disposed is provided behind the lens of the image pickup unit 102. The position (and posture) of a real object recognized in an input image by the image processing apparatus 100 are expressed in two dimensions by a coordinate system $U_c$ (u,v) on the image pickup plane and in three dimensions by a coordinate system $X_c$ ($x_c$, $y_c$, $z_c$) in the real space. The relationship between the two-dimensional coordinate system $U_c$ and the three-dimensional coordinate system $X_c$ is geometrically given in accordance with the so-called "pinhole model", for example. The AR application decides the three-dimensional layout of virtual objects based on the positions and postures of the real objects. From the decided three-dimensional layout, it is possible to generate two-dimensional images of virtual objects. Here, it should be noted that in physical terms, the projection unit 112 is not installed at exactly the same position as the image pickup unit 102. Two-dimensional images generated for output on a display are not appropriate for projection by the projection unit 112 in their present state. For this reason, the image processing apparatus 100 uses coordinate transforming parameters $T_{c\_p}$ and $R_{c\_p}$ to transform the layout $V_c$ of virtual objects for display output to a layout $V_p$ for a projector output. The coordinate transforming parameters may be a coordinate transforming matrix expressing a transformation (translation, rotation and scaling) between the coordinate system $X_c$ ($x_c$,$y_c$,$z_c$) that has the image pickup unit 102 as a standard and the coordinate system $X_p$ ($x_p$,$y_p$,$z_p$) that has the projection unit 112 as a standard. Default values of the coordinate transforming parameters are decided in advance in accordance with the relative positional relationship between the image pickup unit 102 and the projection unit 112 that has been calibrated, and are stored by the storage unit 108, for example.

Note that like a typical projector module, the projection unit 112 may have a unique mechanism for adjusting the projection scale (zoom ratio) and the focus position. As one example, if the projection scale is changed by driving a mechanism of the projection unit 112, the coordinate transforming parameters are recalculated in accordance with the change in the projection scale. As described in detail later, the image processing apparatus 100 may utilize such mechanisms to maintain a favorable projection state.

2-3. Functional Configuration

FIG. 5 is a block diagram showing one example of a configuration of logical functions realized by the storage unit 108 and the control unit 118 of the image processing apparatus 100 shown in FIG. 3. As shown in FIG. 5, the image processing apparatus 100 includes the image acquiring unit 120, a data acquiring unit 130, an environment recognizing unit 140, an environment database (DB) 145, an object control unit 150, a content DB 155, a display control unit 160, a projection control unit 170, and a user interface unit 180.

(1) Image Acquiring Unit

The image acquiring unit 120 acquires picked-up images generated by the image pickup unit 102 as input images. The input images acquired by the image acquiring unit 120 are images in which a real space appears. The input images may be still images or frames that construct video. The image acquiring unit 120 outputs the acquired input images to the environment recognizing unit 140 and the display control unit 160.

(2) Data Acquiring Unit

The data acquiring unit 130 acquires data used for a variety of purposes such as environment recognition and control of displaying or projection of virtual objects. As one example, the data acquiring unit 130 may acquire sensor data (for example, position data and posture data) generated by the sensor unit 104. Also, the data acquiring unit 130 may acquire data relating to real objects present in the vicinity of the present location of the terminal by enquiring to an external data server using the present location of the terminal.

(3) Environment Recognizing Unit

The environment recognizing unit 140 recognizes at least one real object shown in the input images. The environment recognizing unit 140 may also recognize the relative positional relationships (positions and postures) between the recognized real objects and the image pickup unit 102. The environment recognizing unit 140 then stores the result of environment recognition in the environment DB 145.

As one example, the environment recognizing unit 140 acquires map data in which identifiers of respective real objects and positions in the real space are associated. The environment recognizing unit 140 also recognizes the position and posture of the image pickup unit 102 based on sensor data. By matching the camera angle estimated from the position and posture of the image pickup unit 102 against the map data, the environment recognizing unit 140 may recognize where real objects are present in the camera angle.

As an alternative, the environment recognizing unit 140 may also utilize a more advanced environment recognition technology. As one example, the environment recognizing unit 140 acquires model data in which feature amounts of real objects are written. By matching feature amounts extracted from an input image against the feature amounts written in the model data, the environment recognizing unit 140 may recognize what real objects appear where and with what postures in the input image. As examples, known environment recognition technologies include SURF (see H. Bay, A. Ess, T. Tuytelaars and L. V. Gool, "Speeded-Up Robust Features (SURF)", Computer Vision—ECCV, 2006 and SLAM (see Andrew J. Davison, "Real-Time Simultaneous Localization and Mapping with a Single Camera", Proceedings of the 9th IEEE International Conference on Computer Vision Volume 2, 2003, pp. 1403-1410).

The environment DB 145 is a database in which the results of environment recognition by the environment recognizing unit 140 are stored. The results of environment recognition stored by the environment DB 145 include for example the relative positions and postures of recognized real objects with the position and posture of the image pickup unit 102 as a standard. The positions and postures of the real objects may be expressed by the three-dimensional coordinates $X_c$ described with reference to FIG. 4.

(4) Object Control Unit

The object control unit 150 decides the layout of virtual objects that are used for augmented reality and are associated with the real objects recognized by the environment recognizing unit 140 in accordance with the positions and postures of such real objects. More specifically, as one example the object control unit 150 acquires data on virtual objects associated with the recognized real objects from the content DB 155. The object control unit 150 also acquires the positions and postures of such real objects from the environment DB 145. The object control unit 150 then decides the layout of the virtual objects in accordance with the positions and postures of the real objects (in the example in FIG. 2, the virtual object V1 is laid out on the table 21). The object control unit 150 then outputs the identifiers of the virtual objects to be displayed and the three-dimensional layout of such objects to the display control unit 160.

The object control unit 150 changes the virtual objects in accordance with the display mode, as described in detail later. In a given display mode, an image for overlaying virtual objects is outputted from the display control unit 160 to the display unit 110. In another display mode, an image for overlaying virtual objects is outputted from the display control unit 160 to the projection unit 112. When the output destination is the projection unit 112, for example, the object control unit 150 may select simpler virtual objects than when the output destination is the image processing apparatus 100 as the virtual objects to be projected. Meanwhile, if the output destination is the projection unit 112, the object control unit 150 may adjust at least one display attribute of the virtual objects in accordance with the projection resolution. Also, if it is determined that the precision of the recognition process by the environment recognizing unit 140 will decrease due to the projected virtual objects, the object control unit 150 may adjust at least one display attribute of the virtual objects or may move the positions of such virtual objects. In addition, the object control unit 150 may change the information to be shown by the virtual objects in accordance with a privacy level that is set in advance for the information to be projected or is dynamically set.

The content DB 155 is a database in which data for the virtual objects associated with the respective real objects is accumulated. FIG. 6 is a diagram useful in explaining one example of the data structure of the content DB 155. As shown in FIG. 6, the content DB 155 has six data items, namely a content ID 155a, a category 155b, an associated object 155c, a default arrangement 155d, displayed data 155e, and projected data 155f.

The content ID 155a is an identifier for uniquely identifying each virtual object. The category 155b shows the type of each virtual object. The associated object 155c is an identifier of a real object associated with each virtual object. One real object may be associated with a plurality of virtual objects. The default arrangement 155d shows a default arrangement (the position, posture, and scale relative to the associated real object). of each virtual object. The displayed data 155e is actual data for display output of the respective virtual objects. The projected data 155f is actual data for projector output of the respective virtual objects. Such data may be written in any format, such as text format, image format, or a link format for an external data source.

In the example in FIG. 6, although the display output data for the virtual object with the content ID="C4" includes text of a review comment for a restaurant, the projector output data for such virtual object includes only an icon image of a number of star symbols corresponding to a rating. In this way, by setting the AR content for projector output with a simpler content than the AR content for display output, it is possible to avoid a situation where it is difficult to distinguish the AR content in a projected image for which a resolution that is normally lower than a display image can only be expected.

As can be understood from FIG. 6, the projected data 155f can store a plurality of actual data for one virtual object. Such plurality of data may be data corresponding to different projection resolutions or to different privacy levels.

The object control unit 150 controls the virtual objects to be displayed or projected using the content DB 155 with the data structure described above. Note that instead of storing a plurality of data for one virtual object in advance in a database as in the example in FIG. 6, the object control unit 150 may dynamically generate other data from one set of data. The control of virtual objects by the object control unit 150 is described in more detail later in this specification.

(5) Display Control Unit

In a first display mode, the display control unit 160 outputs an output image for overlaying virtual objects to the display unit 110 and has such output image displayed on the screen of the display unit 110. In a second display mode, the display control unit 160 outputs an output image for overlaying virtual objects to the projection unit 112 and has the projection unit 112 project such output image onto a projection surface in the real space. The display control unit 160 may also support a third display mode where images are outputted in parallel to the display unit 110 and the projection unit 112. Such display modes that may be supported by the display control unit 160 are described in detail later with reference to the drawings.

The three-dimensional laying out of virtual objects in the AR space is decided by the object control unit 150 based on the result of environment recognition and data (for example, the default arrangement 155d) in the content DB 155. The display control unit 160 generates two-dimensional image of the virtual objects from the three-dimensional layout of the virtual object in accordance with a pinhole model, for example. The output image outputted from the display control unit 160 to the display unit 110 may be generated by overlaying such two-dimensional image onto the input image, for example. The display control unit 160 also uses the coordinate transforming parameters described earlier to transform the layout of the virtual objects for output to the projection unit 112. The output image outputted from the display control unit 160 to the projection unit 112 may be a two-dimensional image of virtual objects generated in accordance with the layout after transformation.

(6) Projection Control Unit

The projection control unit 170 controls projection by the projection unit 112 based on the position or posture of the image pickup unit 102 recognized by the environment recognizing unit 140. More specifically, the projection control unit 170 controls projection so that the projection state is kept at a standard state that can be adjusted by way of control parameters (hereinafter referred to as "projection control parameters") that are specific to the projection unit 112. In the following description, it is assumed that the projection control parameters include the projection scale and focus position that were described with reference to FIG. 4. Note that the projection control parameters are not limited to this example and may include other types of parameter, such as keystone correction and brightness.

Here, the expression "projection state" may include the resolution, size, integrity, focus state, and the like of the virtual objects on the projection surface.

As one example, if other conditions are fixed, the projection resolution will decrease as the distance between the projection unit 112 and the real object with the projection surface increases. For this reason, the projection control unit 170 avoids a decrease in the projection resolution by reducing the projection scale as the distance described above increases. Also, as the distance between the projection unit 112 and the real object with the projection surface decreases, there is the possibility that the virtual objects will not fit into the projection angle and will be partly missing (that is, integrity of the virtual objects is lost). For this reason, the projection control unit 170 avoids loss of parts of the virtual objects by increasing the projection scale as the distance described above decreases. In either case, by operating in concert with the object control unit 150, the projection control unit 170 changes the sizes of the virtual objects relative to the projection angle so that increases and decreases in the actual size (the projected size) of the virtual objects on the projection surface are cancelled out.

In addition, if, once the focus position has been adjusted so as to sharply project the virtual objects, the distance between the projection unit 112 and the real object changes, there is the possibility of focusing errors occurring. For this reason, the projection control unit 170 controls the focus position so that the focus state of the projected virtual objects is maintained regardless of variations in the distance described above.

In the present embodiment, control of projection by the projection control unit 170 includes two phases, namely an adjustment phase and a maintenance phase. In the adjustment phase, the projection state does not need to be maintained. Moreover, the projection control unit 170 changes the projection state in accordance with adjustment of the projection control parameters by the user. For example, by adjusting the projection scale via a user interface, the user can enlarge or reduce the projection size of the virtual objects. Also, by adjusting the focus position via a user interface, the user can change the focus state of the virtual objects. When a specified user input has been detected, projection control switches from the adjustment phase to the maintenance phase. The projection state at the time when such user input is detected is treated as the standard state in the maintenance phase. The values of the projection control parameters at the time when such user input is detected may be held as standard values for control. In the maintenance phase, the projection control unit 170 controls the projection scale and the focus position so that the projection state is maintained at the standard state regardless of variations in the distance between the projection unit 112 and the real object, for example. Note that by using the default values of the projection control parameters as the standard values for control, it is possible to skip the adjustment phase.

The projection control unit 170 sets, in the projection unit 112, the values of the projection control parameters that are adjusted in this way by the user or are dynamically controlled and drives the specific mechanisms of the projection unit 112. By doing so, the projection state described above is maintained. An example of such projection control carried out by the projection control unit 170 will be described in more detail later with reference to the drawings.

(7) User Interface Unit

The user interface unit 180 provides a variety of user interfaces (UI) for an AR application to the user. As examples, the UI provided by the user interface unit 180 may include a UI for switching the display mode between a plurality of modes, a UI for having the user designate a privacy level, a UI for having the user adjust the projection control parameters, and a UI for having a switch between projection control phases. As examples, the respective UI may be graphical user interfaces (GUI) displayed on a screen or may be touch UI realized using a touch sensor. The respective UI may be physical UI such as switches, buttons, and the like, or a speech UI realized by recognition of spoken commands.

2-4. Various Display Modes

FIGS. 7A to 7C show three examples of display modes that may be supported by the display control unit 160.

The display mode M1 shown in FIG. 7A is a display-only mode. When a mode switching signal SW indicating the display mode M1 has been inputted, the display control unit 160 may switch to display-only mode. The mode switching signal SW may be generated in accordance with a specified user input. In display-only mode, the display control unit 160 outputs an image for overlaying virtual objects to the display unit 110 but does not output an image to the projection unit 112.

The display mode M2 shown in FIG. 7B is a dual mode. When a mode switching signal SW indicating the display mode M2 has been inputted, the display control unit 160 may switch to dual mode. In dual mode, the display control unit 160 outputs an image for overlaying virtual objects to the display unit 110 and also outputs an image for overlaying the same virtual objects or different virtual objects to the projection unit 112.

The display mode M3 shown in FIG. 7C is a projector-only mode. When a mode switching signal SW indicating the display mode M3 has been inputted, the display control unit 160 may switch to projector-only mode. In projector-only mode, the display control unit 160 outputs an image for overlaying virtual objects to the projection unit 112 but does not output an image to the display unit 110.

Note that the display modes described above are mere examples of display modes. That is, additional display modes may also be supported or any of the display modes described above does not need to be supported.

2-5. Control of Projected Virtual Objects

As described earlier, the object control unit 150 changes the virtual objects to be displayed or projected in accordance with which of the display unit 110 and the projection unit 112 is the output destination of images. Note that it is assumed in the present specification that the expression "changes the virtual objects" includes not only using different virtual objects in place of given virtual objects but also changing the layout and/or attributes of given virtual objects or the information shown by such virtual objects.

(1) Projection of Simple Virtual Objects

As one example, if the output destination is the projection unit 112, the object control unit 150 may select simpler virtual objects than when the output destination is the display unit 110 as the virtual objects to be projected. Here, as one example, the expression "simple virtual objects" may mean indications that simply notify a third party of a location subject to attention in the AR application (i.e., a location where a virtual object is to be overlaid on the screen of the display unit 110). As examples, the indications may be frames that surround real objects associated with the virtual objects or icons that point out such real objects. When such a simple virtual object is projected, it is possible for a third party to know what real object is subject to attention by the user of an AR application. In addition, by keeping the details of the AR content secret from the third party, it is possible to protect the privacy of the user.

(2) Control in Accordance with Projection Resolution

If the output destination is the projection unit 112, the object control unit 150 may change the projected virtual objects in accordance with the projection resolution.

FIG. 8 is a diagram useful in explaining control of virtual objects in accordance with the projection resolution. In FIG.

8, the image processing apparatus 100 located at a position $P_{TO1}$ that is close to a real object 22 and the image processing apparatus 100 located at a position $P_{TO2}$ that is far from the real object 22 are shown. One surface of the real object 22 is the projection surface for virtual objects. Normally, if the distance from the projection surface is large, the projection resolution will decrease. In the present embodiment, since, in the adjustment phase in particular, the projection scale is not controlled to maintain the projection resolution, a drop in the projection resolution is not avoided. If the spatial resolution of the virtual objects as graphics decreases below the projection resolution, there is the possibility that detailed parts of the projected virtual objects will be difficult to see (as one example, blurring of text characters may occur). For this reason, the object control unit 150 calculates the distance between the real object with the projection surface and the projection unit 112 using the result of environment recognition by the environment recognizing unit 140, for example, and maintains the projection resolution based on the calculated distance. Data showing the mapping between such distance and the projection resolution may be stored in advance. The object control unit 150 then changes the virtual objects to be projected if the estimated projection resolution decreases below the spatial resolution of the virtual objects. As one example, the object control unit 150 may lower the number of polygons in the virtual objects or may replace virtual objects that have complex graphics with simple icons or the like. In the example in FIG. 8, the virtual object V2b is projected onto the real object 22 by the image processing apparatus 100 located at the position $P_{TO2}$. The virtual object V2b has a lower spatial resolution than the virtual object V2a projected by the image processing apparatus 100 located at the position $P_{TO1}$ as a result of lowering the number of polygons, for example.

(3) Preventing a Drop in Recognition Precision

If it is determined that the precision of the recognition process carried out by the environment recognizing unit 140 will decrease due to the projected virtual objects, the object control unit 150 may adjust at least one display attribute of the virtual objects or move the positions of such virtual objects. Here, as examples, the display attributes may include the brightness, color, and contrast of the virtual objects.

FIG. 9A is a diagram useful in explaining a first example of control of virtual objects to prevent a drop in recognition precision. In FIG. 9A, an image Im31 displayed on the screen by the display unit 110 and an image Im32 projected by the projection unit 112 are shown. In the image Im31, a virtual object V3a is overlaid on a real object 23. A virtual object V3b is also overlaid on the real object 23 in the real space by the image Im32. The brightness of the projected virtual object V3b is lowered below the brightness of the projected virtual object V3a displayed on the screen. By doing so, it is possible to prevent a situation where it becomes difficult for the environment recognizing unit 140 to recognize the real object 23 due to projection light striking the real object 23. In place of the brightness, the object control unit 150 may lower the contrast of the projected virtual object or may adjust the color of the virtual object in accordance with color of the projection surface by carrying out a so-called "color equalization process".

FIG. 9B is a diagram useful in explaining a second example of control of virtual objects to prevent a drop in recognition precision. In the same way as FIG. 9A, FIG. 9B shows an image Im31 displayed on the screen and an image Im33 projected by the projection unit 112. Using the image Im33, the virtual object V3c is projected not onto the real object 23 but a projection surface in the vicinity of the real object 23. That is, the position of the virtual object V3c is moved from the display position of the virtual object V3a that is displayed on the screen. In this case, since striking of the real object 23 by the projection light is avoided, it is possible to prevent a situation where it becomes difficult for the environment recognizing unit 140 to recognize the real object 23. Note that the object control unit 150 may move the position of the virtual object V3c in accordance with a user input such as a flick or a drag on the screen, for example.

(4) Control in Accordance With Privacy Level

When the output destination is the projection unit 112, the object control unit 150 may change the virtual objects to be projected in accordance with a privacy level set in advance for information projected by the projection unit 112 or dynamically set.

FIG. 10A and FIG. 10B show two examples of control of virtual objects in accordance with a privacy level set by the user. On the left in FIG. 10A, the image processing apparatus 100 that picks up an image of a real object 24 is shown. The real object 24 is a calendar. On the screen of the display unit 110, a virtual object V4a is overlaid on the calendar 24. The virtual object V4a shows detailed information (for example, the location and participants for a meeting) of a schedule item associated with a date written on the calendar 24. Meanwhile, the virtual object V4c is projected onto the calendar 24 in the real space. The virtual object V4c is a simple icon merely informing the user that a schedule item associated with a date written on the calendar 24 exists.

Here, if a specified user input is detected by the user interface unit 180, for example, the setting of the privacy level is changed. In the example in FIG. 10A, a pinch out that is one type of touch gesture is detected. In the present embodiment, a pinch out may mean a lowering of the privacy level. In accordance with the detection of the pinch out, the object control unit 150 changes the virtual object V4c to the virtual object V4b. The virtual object V4b is projected onto the calendar 24 shown on the right in FIG. 10A. The virtual object V4b shows a title (for example, "meeting") of a schedule item associated with the date written on the calendar 24. As the opposite to the illustrated operation, the object control unit 150 may raise the privacy level in accordance with the detection of a pinch in, for example, and change the virtual object V4b to the virtual object V4c.

On the left in FIG. 10B, the image processing apparatus 100 that picks up an image of the calendar 24 is shown again. On the screen of the display unit 110, the virtual object V4a is overlaid on the calendar 24. Meanwhile, the virtual object V4b is projected onto the calendar 24 in the real space. At the right end of the screen, a slider U10 which is a GUI for enabling the user to indicate the privacy level is displayed. If the slider U10 is dragged downward or tapped by the user, the setting of the privacy level is lowered. In accordance with this, the object control unit 150 changes the virtual object V4b to the virtual object V4a. The virtual object V4a that is the same as the object displayed on the screen is projected onto the calendar 24 shown on the right in FIG. 10B.

By carrying out control in accordance with the privacy level in this way, it becomes possible for the user of the AR application to flexibly indicate a level for sharing AR content with third parties from the viewpoint of privacy.

The various control carried out over the projected virtual objects described in this specification may be used in any combination.

2-6. Utilization of Projection Control Parameters

If the technology according to the present embodiment of the disclosure is realized using a mobile terminal, the position and posture of the mobile terminal may vary during operation of the AR application both deliberately on the part of the user and unintentionally. So long as the recognition process by the environment recognizing unit 140 operates appropriately, such variation in the position and posture of the terminal are correctly recognized and a proper display state is maintained for the virtual objects. However, even if the variation in the position and posture of the terminal are correctly recognized, under certain conditions the projection state of the virtual objects may become inappropriate. For this reason, as described earlier, the projection control unit 170 utilizes the projection control parameters that are specific to the projection unit 112 to control projection so as to maintain an appropriate projection state.

FIG. 11A is a diagram useful in explaining a first example of a situation where the projection state may become inappropriate. On the left in FIG. 11A, the image processing apparatus 100 that picks up an image of a real object 25 is shown. A virtual object V5a is projected onto the real object 25. It is assumed that the value of the projection scale Sc at this time is Sc=sc1. The projection angle PA1 corresponds to such value of the projection scale. On the right in FIG. 11A, the image processing apparatus 100 that is positioned further from the real object 25 is shown. The environment recognizing unit 140 recognizes the change in the distance to the real object 25. In accordance with this change, the object control unit 150 reduces the size of the virtual object relative to the projection angle PA1. As a result, a virtual object V5b is projected onto the real object 25. The projection size (i.e., the actual size on the projection surface) of the virtual object V5b is equal to the projection size of the virtual object V5a. However, reducing the size of the virtual object relative to the projection angle can lead to a lower projection resolution. Also, if the virtual object V5b is a complex graphic, there is the possibility that detailed parts of such graphic will be difficult to see (as one example, blurring of text characters may occur). In particular, in cases where measures such as the switching of virtual objects as described earlier are not taken, it is preferable to avoid a drop in the projection resolution.

FIG. 11B is a diagram useful in explaining control for maintaining an appropriate projection state for the situation in FIG. 11A. On the left in FIG. 11B, the situation where the projection resolution has decreased as shown on the right in FIG. 11A is shown once more. The distance from the real object 25 to the image processing apparatus 100 on the right in FIG. 11B is the same as on the left in FIG. 11A. The projection control unit 170 reduces the value of the projection scale Sc from sc1 to sc2 in keeping with the increase in the distance acquired based on the result of environment recognition. In accordance with this, the projection angle PA2 becomes narrower than the projection angle PA1. The size of the virtual object relative to the projection angle is enlarged. As a result, a virtual object V5c is projected onto the real object 25. The projection size of the virtual object V5c is the same as the projection sizes of the virtual objects V5a and V5b. Since the size of the virtual object relative to the projection angle is enlarged, the projection resolution is maintained regardless of the variation in the distance.

FIG. 12A is a diagram useful in explaining a second example of a situation where the projection state may become inappropriate. On the left in FIG. 12A, the image processing apparatus 100 that picks up an image of a real object 26 is shown. A virtual object V6a is projected onto the real object 26. It is assumed that the value of the projection scale Sc at this time is Sc=sc1. The projection angle PA1 corresponds to such value of the projection scale. On the right in FIG. 12A, the image processing apparatus 100 that is positioned closer to the real object 26 is shown. The environment recognizing unit 140 recognizes the change in the distance to the real object 26. In accordance with this change, the object control unit 150 increases the size of the virtual object relative to the projection angle PA1. As a result, a virtual object V6b is projected onto the real object 26. However, the virtual object V6b does fit within the projection angle PA1 so that part of the projected virtual object V6b is missing.

FIG. 12B is a diagram useful in explaining control for maintaining an appropriate projection state for the situation in FIG. 12A. On the left in FIG. 12B, the situation where part of the virtual object is missing as shown on the right in FIG. 12A is shown once more. The distance from the real object 26 to the image processing apparatus 100 on the right in FIG. 12B is the same as the distance on the left in FIG. 12B. The projection control unit 170 increases the value of the projection scale Sc from sc1 to sc3 in keeping with the reduction in the distance acquired based on the result of environment recognition. In keeping with this, the projection angle PA3 becomes wider than the projection angle PA1. The size of the virtual object relative to the projection angle is reduced. As a result, the virtual object V6c is projected onto the real object 26. The projection size of the virtual object V6c is the same as the projection size of the virtual object V6a and integrity of the virtual object V6c is maintained (that is, no parts of the virtual object V6c are missing).

In the maintenance phase, the projection control unit 170 maintains an appropriate projection state by controlling the projection scale in this way. Here, the expression "appropriate state" typically refers to a standard state decided via adjustments made by the user in the adjustment phase. Alternatively, a default state stored in advance by the content DB 155 for example may be used as the standard state.

FIG. 13 is a diagram useful in explaining one example of a user interface that may be provided in order to utilize the projection control parameters. On the left in FIG. 13, a slider UI1, a slider UI2, a button UI3, and a button UI4 displayed on the screen of the image processing apparatus 100 in the adjustment phase are shown. The slider UI1 is a user interface for adjusting the projection scale Sc. The user is capable of enlarging or reducing the projection scale Sc by sliding the slider UI1 to the left or right. By doing so, the projection resolution and projection size of the virtual objects may be changed. The slider UI2 is a user interface for adjusting a focus position Fc. The user is capable of moving the focus position Fc in the depth direction by sliding the slider UI2 to the left or right. By doing so, the sharpness (degree of blurring) of the projected virtual objects may be changed. The button U13 and the button U14 are both user interfaces for switching the phase to the maintenance phase. On detecting a touch on the button U13, the projection control unit 170 stores the values of the projection control parameters at the time of such detection as standard values and the values of the projection control parameters are subsequently controlled so that the projection state at this time (that is, the standard state) is maintained. On detecting a touch on the button U14, the projection control unit 170 reads the default values of the projection control parameters from a database and the values of the projection control parameters are subsequently controlled so that the default projection state (that is, the standard state) is maintained. On the right in FIG. 13, a button U15 displayed on the screen of the image processing apparatus 100 in the maintenance phase is shown. The button U15 is a user interface for switching the phase to the adjustment phase.

Note that if, in the adjustment phase, a parameter value that exceeds a tolerated range is indicated by the user, the user interface unit 180 may display or project a warning message. Also, if, in the maintenance phase, the terminal is moved to a position where the projection state is not be able to be maintained, the user interface unit 180 may display or project a warning message.

The user interfaces shown in FIG. 13 are mere examples. In place of the illustrated user interfaces, it is also possible to use a variety of other GUI, touch UI, physical UI, or audio (speech) UI.

3. Flow of Processing

Next, the flow of processing according to the present embodiment is described with reference to FIGS. 14 to 16.

3-1. Overall Flow

FIG. 14 is a flowchart showing one example of the overall flow of processing according to the present embodiment.

As shown in FIG. 14, the image acquiring unit 120 first acquires a picked-up image generated by the image pickup unit 102 as an input image (step S10). Next, the environment recognizing unit 140 recognizes at least one real object shown in the input image (step S15). The subsequent processing is carried out when recognition of at least one real object by the environment recognizing unit 140 has succeeded (step S20).

If a real object has been recognized, the environment recognizing unit 140 recognizes the positional relationship (position and posture) of the image pickup unit 102 relative to the recognized real object (step S30). Next, the object control unit 150 acquires data on a virtual object associated with the recognized real object from the content DB 155 (step S35). After this, the object control unit 150 lays out the virtual object in the AR space in accordance with the position and posture of the real object (step S40).

The subsequent processing switches depending on the display mode at this time. If the display mode is display-only mode or dual mode, the processing in step S55 and S60 is carried out (step S50). In step S55, the display control unit 160 generates an image for display output by overlaying an image of the virtual object generated in accordance with a pinhole model, for example onto the input image. The display control unit 160 then outputs the generated image to the display unit 110 (step S60).

If the display mode is dual mode or projector-only mode, the projection control process in step S75 is carried out (step S70).

3-2. Projection Control Process

FIG. 15 is a flowchart showing one example of the detailed flow of the projection control process carried out in step S70 in FIG. 14.

As shown in FIG. 15, the projection control process first branches depending on the phase (step S100). In the adjustment phase, the projection control unit 170 acquires the values of the projection control parameters (for example, the projection scale and the focus position) to be adjusted via the user interfaces (step S110).

Meanwhile, in the maintenance phase, the projection control unit 170 decides the values of the projection control parameters based on variations in the position and posture of the projector (step S120). As one example, if the distance from the projector to the real object has increased after the switch to the maintenance phase, the projection control unit 170 reduces the projection scale from the standard value. Conversely, if the distance from the projector to the real object has decreased after the switch to the maintenance phase, the projection control unit 170 increases the projection scale from the standard value. The projection control unit 170 may change the focus position so that the focus state is maintained regardless of the variation in the distance described above.

Next, the object control unit 150 recalculates the coordinate transforming parameters based on the values of the projection control parameters acquired or decided by the projection control unit 170 (step S130). After this, the object control unit 150 carries out a projected object control process to change the virtual object that is projected (step S140).

Next, as described above with reference to FIG. 4, the display control unit 160 uses the coordinate transforming parameters to transform the three-dimensional layout of the projected virtual object to a layout for projector output (step S150). After this, the display control unit 160 generates an image for projector output of the virtual object from the three-dimensional layout of the virtual object after transformation of the coordinates (step S160).

Next, the projection control unit 170 sets the values of the projection control parameters acquired in step S110 or decided in step S120 in the projection unit 112 and drives the specific mechanisms of the projection unit 112 (step S170). The display control unit 160 then outputs the image for projector output to the projection unit 112 (step S180).

3-3. Projected Object Control Process

FIG. 16 is a flowchart showing one example of the detailed flow of the projected object control process executed in step S140 in FIG. 15.

As shown in FIG. 16, the object control unit 150 first switches the virtual object to be projected in accordance with the privacy level that may be indicated as described earlier with reference to FIGS. 10A and 10B for example (step S141).

Next, the object control unit 150 estimates the projection resolution based on the distance between the real object and the projection unit 112 and the value of the projection scale supplied from the projection control unit 170 (step S142). If the estimated projection resolution decreases below the spatial resolution of the virtual object, the object control unit 150 then adjusts the graphic of the virtual object (step S143). As one example, the object control unit 150 may lower the number of polygons in the virtual object.

The object control unit 150 determines the risk of a drop in the precision of the recognition process carried out by the environment recognizing unit 140 due to the projected virtual object (step S144). Virtual objects for which there is a large risk of a drop in such precision may be defined in advance in the content DB 155. If there is a high risk of a drop in the precision of the recognition process, the object control unit 150 adjusts display attributes such as the brightness, color, and contrast of the virtual object or moves the virtual object (step S145).

As a result of the projection control process in FIG. 15, a virtual object that has been adapted for projection in this way is projected from the projection unit 112 onto the projection surface in the real space. After this, the processing returns to step S10 in FIG. 14 and the same process is repeated for the next input image.

Note that the processing according to the present embodiment described above is merely one example. It is also possible for a number of the processing steps described above to be omitted and for other processing steps to be additionally carried out. Also, a number of the processing steps may be carried out in parallel and/or the processing order may be changed.

4. Example Application

FIG. 17 is a diagram useful in explaining one example of an AR application that may be realized by applying the technology according to an embodiment of the present disclosure.

In FIG. 17, three image processing apparatuses 100a, 100b, and 100c that have the same configuration as the image processing apparatus 100 described earlier are shown. The image processing apparatuses 100a, 100b, and 100c are each held by a different user (not shown). The image pickup units 102 and the projector units 112 of the image processing apparatuses 100a, 100b, and 100c are pointed toward a menu 27 of a restaurant present in a real space. The AR application running on the image processing apparatus 100a places attention on the menu item 28 written on the menu 27 and projects a virtual object V7a onto the menu item 28. In the same way, the AR application that runs on the image processing apparatus 100b also places attention on the menu item 28 and projects a virtual object V7b onto the menu item 28. The virtual objects V7a and V7b may be simple indications that give notification of the position of the real object subject to attention or may be complex graphics. The environment recognizing unit 140 of the image processing apparatus 100c recognizes the menu item 28. After this, the object control unit 150 of the image processing apparatus 100c determines the interest levels of other users in the menu item 28 based on the intensity of the projection light projected onto the menu item 28. In the example in FIG. 17, the object control unit 150 is capable of determining that the menu item 28 has attracted the interest of two users. The object control unit 150 then changes the virtual object to be displayed or projected in accordance with the determined interest levels, for example. In the example in FIG. 17, a virtual object V8 giving the user notification to pay attention to the menu item 28 is overlaid on the menu item 28 on the screen of the image processing apparatus 100c.

In this way, by projecting a virtual object of an AR application onto the three-dimensional position in the real space corresponding to the display position in addition to displaying the virtual object on the screen, the projection light is fed back to the AR application via the input images. By using such feedback, it is possible for an AR application to provide richer information.

5. Conclusion

This completes the description of various embodiments of the technology according to the embodiment of the present disclosure with reference to FIGS. 1 to 17. According to the embodiments described above, since virtual objects are projected onto three-dimensional positions corresponding to the display positions of virtual objects for producing AR, it is possible to give a sense of augmented reality not only to the user of the AR application but also to a third party. That is, it is possible to share the sense of augmented reality between the user and a third party. Also, if the AR application is used in a public place, it will be possible for a third party to know the intention of an action taken by a user holding up a camera. By doing so, it is possible to stimulate the interest of the third party and encourage the third party to join in the AR application.

Also, according to the embodiments described above, since the projection of the virtual objects is controlled based on the position and posture of the terminal recognized using the input images, it is possible to maintain an appropriate projection state for the virtual objects. In particular, by controlling control parameters that are specific to a projector, such as projection scale, it is possible to effectively prevent projection problems that are difficult to be avoided with mere adjustment of the virtual objects on an application level.

The series of control processes carried out by each apparatus described in the present specification may be realized by software, hardware, or a combination of software and hardware. Programs that compose such software may be stored in advance for example on a storage medium provided inside or outside each of the apparatus. As one example, during execution, such programs are written into RAM (Random Access Memory) and executed by a processor such as a CPU.

Instead of being implemented in the present apparatus itself, some of the logical functions of the apparatus may be implemented in an apparatus present in a cloud computing environment. In such case, the information exchanged between the logical functions may be transmitted or received between apparatuses via the communication unit 114 illustrated in FIG. 3.

Although preferred embodiments of the present disclosure are described in detail above with reference to the appended drawings, the technical scope of the disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:

an image acquiring unit acquiring an input image generated by imaging a real space using an image pickup apparatus;

a recognizing unit recognizing a real object shown in the input image;

an object control unit deciding a display position of a virtual object for augmented reality associated with the real object recognized by the recognizing unit in accordance with a position of the real object; and a display control unit outputting an output image on which the virtual object is to be overlaid to a projection apparatus to project the output image onto a three-dimensional position corresponding to the display position.

(2) The image processing apparatus according to (1), wherein the display control unit is operable in a first display mode to output the output image to a display apparatus and is operable in a second display mode to output the output image to the projection apparatus.

(3) The image processing apparatus according to (2), wherein the object control unit changes a virtual object to be displayed or projected in accordance with which of the display apparatus or the projection apparatus is an output destination of the output image.

(4) The image processing apparatus according to (3), wherein the object control unit is operable when the output destination of the output image is the projection apparatus, to set a simpler virtual object than when the output destination of the output image is the display apparatus as the virtual object to be projected.

(5) The image processing apparatus according to (3) or (4),
wherein the object control unit is operable when the output destination of the output image is the projection apparatus, to change the virtual object to be projected in accordance with a resolution of projection.

(6) The image processing apparatus according to (5), wherein the object control unit estimates the resolution based on a distance between the real object and the projection apparatus.

(7) The image processing apparatus according to any one of (3) to (6),
wherein the object control unit is operable when it is determined that a precision of a process of recognition performed by the recognizing unit decreases due to the virtual object to be projected, to adjust at least one display attribute of the virtual object to be projected.

(8) The image processing apparatus according to any one of (3) to (6),
wherein the object control unit is operable when it is determined that a precision of a process of recognition performed by the recognizing unit decreases due to the virtual object to be projected, to move the position of the virtual object to be projected.

(9) The image processing apparatus according to any one of (3) to (8),
wherein the object control unit is operable when the output destination of the output image is the projection apparatus, to change information shown by the virtual object to be projected, in accordance with a privacy level which is set in advance or dynamically indicated.

(10) The image processing apparatus according to (9), further including:
a user interface unit for enabling a user to indicate the privacy level.

(11) The image processing apparatus according to any one of (1) to (10),
wherein the object control unit determines interest levels of one or more users in the real object based on an intensity of projection light projected on the real object and changes the virtual object to be displayed or projected in accordance with the determined interest levels.

(12) The image processing apparatus according to any one of (1) to (11),
wherein the image processing apparatus is a mobile terminal further including the image pickup apparatus and the projection apparatus, and
wherein a relative position and posture between the image pickup apparatus and the projection apparatus are known to the image processing apparatus.

(13) The image processing apparatus according to any one of (1) to (12),
wherein at least one of the image acquiring unit, the recognizing unit, the object control unit, or the display control unit is realized by an apparatus present on a cloud computing environment instead of the image processing apparatus.

(14) A projection control method including:
acquiring an input image generated by imaging a real space using an image pickup apparatus;
recognizing a real object shown in the input image;
deciding a display position of a virtual object for augmented reality associated with the real object to be recognized in accordance with a position of the real object; and
outputting an output image on which the virtual object is to be overlaid to a projection apparatus to project the output image onto a three-dimensional position corresponding to the display position.

(15) A program for causing a computer controlling an image processing apparatus to function as:
an image acquiring unit acquiring an input image generated by imaging a real space using an image pickup apparatus;
a recognizing unit recognizing a real object shown in the input image;
an object control unit deciding a display position of a virtual object for augmented reality associated with the real object recognized by the recognizing unit in accordance with a position of the real object; and
a display control unit outputting an output image on which the virtual object is to be overlaid to a projection apparatus to project the output image onto a three-dimensional position corresponding to the display position.

Additionally, the present technology may also be configured as below.

(1) An information processing apparatus including: an image pickup unit configured to acquire an image; a processor configured to perform an image recognition process on the image acquired by the image pickup unit to recognize a physical object in the image, and generate a virtual image including a virtual object positioned relative to the physical object recognized in the image; a display unit configured to display the virtual image; and a projection unit configured to project at least a portion of the virtual image.

(2) The information processing apparatus of (1), wherein in a first mode, the processor controls the display unit to display the virtual image; and in a second mode, the processor controls the projection unit to project at least the portion of the virtual image.

(3) The information processing apparatus of (2), wherein in the first mode, the processor controls the projection unit to inhibit projection of the virtual image, and in the second mode, the processor controls the display to inhibit display of the virtual image.

(4) The information processing apparatus of any one of (1) to (3), wherein in a third mode, the processor controls the display unit to display the virtual image and controls the projection unit to project at least the portion of the virtual image.

(5) The information processing apparatus of any one of (1) to (4), wherein a version of the virtual object projected by the projection unit is projected with lower detail than a version of the virtual object displayed by the display unit as part of the virtual image.

(6) The information processing apparatus of any one of (1) to (5), wherein a resolution of the virtual object projected by the projection unit is adjusted based on a distance between the projection unit and a target of a projected virtual image.

(7) The information processing apparatus of any one of (1) to (6), wherein an attribute of the virtual object projected by the projection unit is modified based on an accuracy of the image recognition process.

(8) The information processing apparatus of (7), wherein the attribute of the virtual object projected by the projection unit is modified to increase the accuracy of the image recognition process.

(9) The information processing apparatus of any one of (7) to (8), wherein the attribute is a position of projection of the virtual object.

(10) The information processing apparatus of (9), wherein the position of projection of the virtual object is changed to increase the accuracy of the image recognition process.

(11) The information processing apparatus of any one of (9) to (10), wherein the position of projection of the virtual object is changed based on a user input.

(12) The information processing apparatus of (11), wherein the display includes a touch screen, and the user input is a gesture on the touch screen.

(13) The information processing apparatus of (12), wherein the gesture includes a flick or a drag along the touch screen.

(14) The information processing apparatus of any one of (1) to (13), further comprising: an input unit to receive a user input, wherein the virtual object projected by the projection unit is changed based on a privacy level received at the input unit.

(15) The information processing apparatus of any one of (1) to (14), wherein the processor adjusts a projection size and a projection resolution of the virtual object projected by the projection unit based on a distance from the projection unit to a projection target.

(16) The information processing apparatus of any one of any one of (1) to (15), wherein the physical object is recognized in three-dimensional space and the virtual object is generated at a three-dimensional position relative to the physical object in the three-dimensional space.

(17) The information processing apparatus of (16), wherein the physical object is a three-dimensional physical object and the virtual object is a three-dimensional virtual object.

(18) An information processing system including: a plurality of information processing devices, each including an image pickup unit configured to acquire an image; a processor configured to perform an image recognition process on the image acquired by the image pickup unit to recognize a physical object in the image, and generate a virtual image including a virtual object positioned relative to the physical object recognized in the image, a display unit configured to display the virtual image under control of the processor, and a projection unit configured to project at least a portion of the virtual image under control of the processor, wherein one of the plurality of information processing devices determines an interest level in the physical object based on a light intensity of virtual images projected by other information processing devices.

(19) An information processing method including: acquiring an image in an image pickup unit; performing, in a processor, an image recognition process on the image acquired to recognize a physical object in the image; generating, in the processor, a virtual image including a virtual object positioned relative to the physical object recognized in the image; displaying the virtual image on a display unit; and projecting at least a portion of the virtual image by a projection unit.

(20) A non-transitory computer-readable medium storing computer readable instructions thereon, the computer-readable instructions when executed by a computer cause the computer to perform a method including: acquiring an image; performing an image recognition process on the image acquired to recognize a physical object in the image; generating a virtual image including a virtual object positioned relative to the physical object recognized in the image; displaying the virtual image; and projecting at least a portion of the virtual image.

REFERENCE SIGNS LIST

100 Image processing apparatus
102 Image pickup unit (image pickup apparatus)
110 Display unit (display apparatus)
112 Projection unit (projection apparatus)
120 Image acquiring unit
140 Environment recognizing unit
150 Object control unit
160 Display control unit
170 Projection control unit
180 User interface unit

The invention claimed is:

1. An information processing apparatus, comprising:
a camera configured to acquire an image of a real space;
a processor configured to
    perform an image recognition process on the image acquired by the camera to recognize a physical object in the acquired image,
    generate environment data that indicate a posture and a position of the physical object in the real space based on the acquired image,
    generate a virtual image including a virtual object positioned at a first position in the virtual image relative to the physical object recognized in the acquired image based on the environment data,
    determine whether projecting at least a portion of the virtual object onto the real space at a second position that corresponds to the first position in the virtual image decreases a recognition accuracy of the image recognition process as a result of overlaying the portion of the virtual object on the physical object, and
    when a determination indicates that projecting at least the portion of the virtual object onto the real space at the second position decreases the recognition accuracy of the image recognition process, perform a color equalization process that adjusts a color of the virtual object relative to the real space to increase the recognition accuracy;
a display configured to display the virtual image that includes the virtual object positioned at the first position in the virtual image; and
a projector configured to project at least the portion of the virtual object with the adjusted color onto the real space at the second position.

2. The information processing apparatus according to claim 1, wherein
in a first mode, the processor controls the display to display the virtual image; and
in a second mode, the processor controls the projector to project at least the portion of the virtual object.

3. The information processing apparatus according to claim 2, wherein
in the first mode, the processor controls the projector to inhibit projection of the virtual object, and
in the second mode, the processor controls the display to inhibit display of the virtual image.

4. The information processing apparatus according to claim 3, wherein in a third mode, the processor controls the display to display the virtual image and controls the projector to project at least the portion of the virtual object.

5. The information processing apparatus according to claim 1, wherein a resolution of the virtual object projected by the projector is adjusted based on a distance between the projector and the position of projection of the virtual object in the real space.

6. The information processing apparatus according to claim 1, wherein the position of projection of the virtual object is changed based on a user input.

7. The information processing apparatus according to claim 6, wherein the display includes a touch screen, and the user input is a gesture on the touch screen.

8. The information processing apparatus according to claim 7, wherein the gesture includes a flick or a drag along the touch screen.

9. The information processing apparatus according to claim 1, wherein the processor adjusts a projection size and a projection resolution of the virtual object projected by the projector based on a distance from the projector to the position of projection of the virtual object in the real space.

10. The information processing apparatus according to claim 1, wherein the position of the physical object in the real space is recognized and the position of projection of the virtual object in the real space is set relative to the position of the physical object in the real space.

11. The information processing apparatus according to claim 10, wherein the physical object is a three-dimensional physical object and the virtual object is a three dimensional virtual object.

12. An information processing system, comprising:
a plurality of information processing devices, each including
a camera configured to acquire an image of a real space;
a processor configured to
perform an image recognition process on the image acquired by the camera to recognize a physical object in the acquired image, and
generate a virtual image including a virtual object positioned relative to the physical object recognized in the acquired image;
a display configured to display the virtual image under control of the processor; and
a projector configured to project at least a portion of the virtual object onto the real space under control of the processor,
wherein one of the plurality of information processing devices is configured to determine an interest level in the physical object based on intensity of projection light projected onto the physical object in the real space.

13. An information processing method, comprising:
acquiring an image of a real space by a camera;
performing, by a processor, an image recognition process on the image acquired to recognize a physical object in the image;
generating environment data that indicate a posture and a position of the physical object in the real space based on the acquired image;
generating, by the processor, a virtual image including a virtual object positioned at a first position in the virtual image relative to the physical object recognized in the image based on the environment data;
determining whether projecting at least a portion of the virtual object onto the real space at a second position that corresponds to the first position in the virtual image decreases a recognition accuracy of the image recognition process as a result of overlaying the portion of the virtual object on the physical object;
when a determination indicates that projecting at least the portion of the virtual object onto the real space at the second position decreases the recognition accuracy of the image recognition process, performing a color equalization process that adjusts a color of the virtual object relative to the real space to increase the recognition accuracy;
displaying the virtual image that includes the virtual object positioned at the first position in the virtual image on a display unit; and
projecting, by a projector, at least the portion of the virtual object with the adjusted color onto the real space at the second position.

14. A non-transitory computer-readable medium storing computer readable instructions thereon, the computer-readable instructions when executed by a computer cause the computer to perform a method comprising:
acquiring an image of a real space;
performing an image recognition process on the image acquired to recognize a physical object in the image;
generating environment data that indicate a posture and a position of the physical object in the real space based on the acquired image;
generating a virtual image including a virtual object positioned at a first position in the virtual image relative to the physical object recognized in the image based on the environment data;
determining whether projecting at least a portion of the virtual object onto the real space that at a second position corresponds to the first position in the virtual image decreases a recognition accuracy of the image recognition process as a result of overlaying the portion of the virtual object on the physical object;
when a determination indicates that projecting at least the portion of the virtual object onto the real space at the second position decreases the recognition accuracy of the image recognition process, performing a color equalization process that adjusts a color of the virtual object relative to the real space to increase the recognition accuracy;
displaying the virtual image that includes the virtual object positioned at the first position in the virtual image; and
projecting at least the portion of the virtual object with the adjusted color onto the real space at the second position.

* * * * *